US012566545B2

(12) United States Patent
Kong et al.

(10) Patent No.: US 12,566,545 B2
(45) Date of Patent: Mar. 3, 2026

(54) SCREEN SPLITTING METHOD AND APPARATUS, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventors: Fanxiu Kong, Dongguan (CN); Han Li, Dongguan (CN); Yilun Wan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 259 days.

(21) Appl. No.: 18/364,474

(22) Filed: Aug. 2, 2023

(65) Prior Publication Data

US 2023/0376198 A1 Nov. 23, 2023

Related U.S. Application Data

(63) Continuation of application No. PCT/CN2022/070489, filed on Jan. 6, 2022.

(30) Foreign Application Priority Data

Feb. 4, 2021 (CN) .......................... 202110158855.7

(51) Int. Cl.
*G06F 3/04886* (2022.01)
*G06F 3/0488* (2022.01)

(52) U.S. Cl.
CPC ........ *G06F 3/04886* (2013.01); *G06F 3/0488* (2013.01); *G06F 2203/04803* (2013.01); *G06F 2203/04808* (2013.01)

(58) Field of Classification Search
CPC ............. G06F 3/04886; G06F 3/04883; G06F 3/0481; G06F 3/0488; G06F 3/048;
(Continued)

(56) References Cited

U.S. PATENT DOCUMENTS

| | | | | |
|---|---|---|---|---|
| 10,042,546 B2* | 8/2018 | Karmi | ................. | G06F 3/04883 |
| 10,126,914 B2* | 11/2018 | Hiroura | ................. | G06F 3/0488 |
| 2014/0351748 A1* | 11/2014 | Xia | ..................... | G06F 3/04847 |
| | | | | 715/798 |
| 2015/0100914 A1* | 4/2015 | Guan | .................... | G06F 3/0481 |
| | | | | 715/781 |

(Continued)

FOREIGN PATENT DOCUMENTS

| | | |
|---|---|---|
| CN | 104035704 | 9/2014 |
| CN | 106020592 | 10/2016 |

(Continued)

OTHER PUBLICATIONS

CNIPA, First Office Action for CN Application No. 202110158855.7, Mar. 30, 2024.

(Continued)

*Primary Examiner* — Ting Z Lee
(74) *Attorney, Agent, or Firm* — Hodgson Russ LLP

(57) ABSTRACT

A split screen method, an electronic device, and a storage medium are disclosed. The method includes: in response to a two-finger sliding operation acting on a touch screen, obtaining a sliding direction corresponding to the two-finger sliding operation; and splitting a displayable area into a first split screen area and a second split screen area based on the sliding direction, one of the first split screen area and the second split screen area is used to display a multi-task interface. In this way, split screen operation steps are simplified to improve a split screen speed.

20 Claims, 18 Drawing Sheets

(58) Field of Classification Search
CPC . G06F 2203/04803; G06F 2203/04808; G06F
2203/04104
See application file for complete search history.

(56) References Cited

U.S. PATENT DOCUMENTS

| | | | |
|---|---|---|---|
| 2015/0169216 A1* | 6/2015 | Cho | G06F 3/04883 |
| | | | 715/764 |
| 2016/0210041 A1* | 7/2016 | Yang | G06F 3/04842 |
| 2016/0231857 A1* | 8/2016 | Kano | G06F 3/04845 |
| 2016/0249006 A1 | 8/2016 | Park et al. | |
| 2018/0356972 A1* | 12/2018 | Wang | G06F 3/04883 |
| 2019/0324635 A1 | 10/2019 | Fu et al. | |
| 2020/0183574 A1* | 6/2020 | Chen | G06F 3/04883 |
| 2020/0252579 A1 | 8/2020 | Fukui et al. | |
| 2024/0020367 A1* | 1/2024 | Shen | H04M 1/724631 |

FOREIGN PATENT DOCUMENTS

| | | |
|---|---|---|
| CN | 106569712 | 4/2017 |
| CN | 107577414 | 1/2018 |
| CN | 108632462 | 10/2018 |
| CN | 108845755 | 11/2018 |
| CN | 109032487 | 12/2018 |
| CN | 109597558 | 4/2019 |
| CN | 109675300 | 4/2019 |
| CN | 110134311 | 8/2019 |
| CN | 110244893 | 9/2019 |
| CN | 110609652 | 12/2019 |
| CN | 111142769 | 5/2020 |
| CN | 111597006 | 8/2020 |

OTHER PUBLICATIONS

WIPO, International Search Report and Written Opinion for PCT/CN2022/070489, Mar. 22, 2022.

EPO, Search Report for EP Application No. 22748795.6, Jul. 9, 2024.

CNIPA, Second Office Action for CN Application No. 202110158855.7, Nov. 9, 2024.

CNIPA, Notification to Grant Patent Right for Invention for CN Application No. 202110158855.7, Jan. 16, 2025.

* cited by examiner

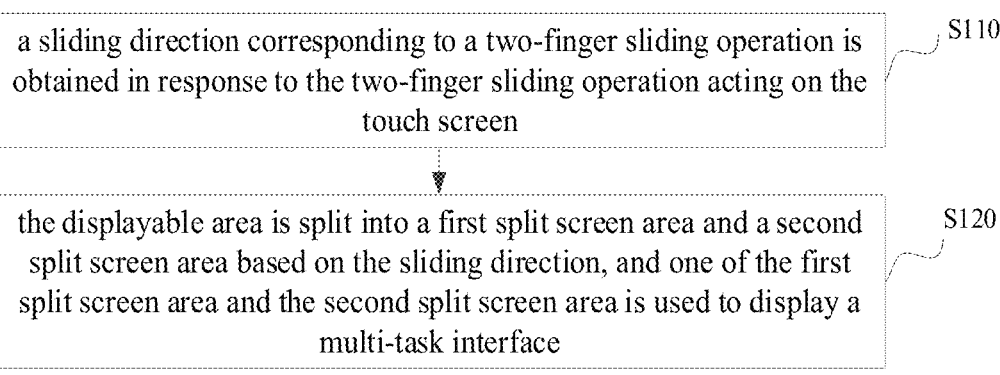

a sliding direction corresponding to a two-finger sliding operation is obtained in response to the two-finger sliding operation acting on the touch screen — S110 the displayable area is split into a first split screen area and a second split screen area based on the sliding direction, and one of the first split screen area and the second split screen area is used to display a multi-task interface — S120

FIG. 1

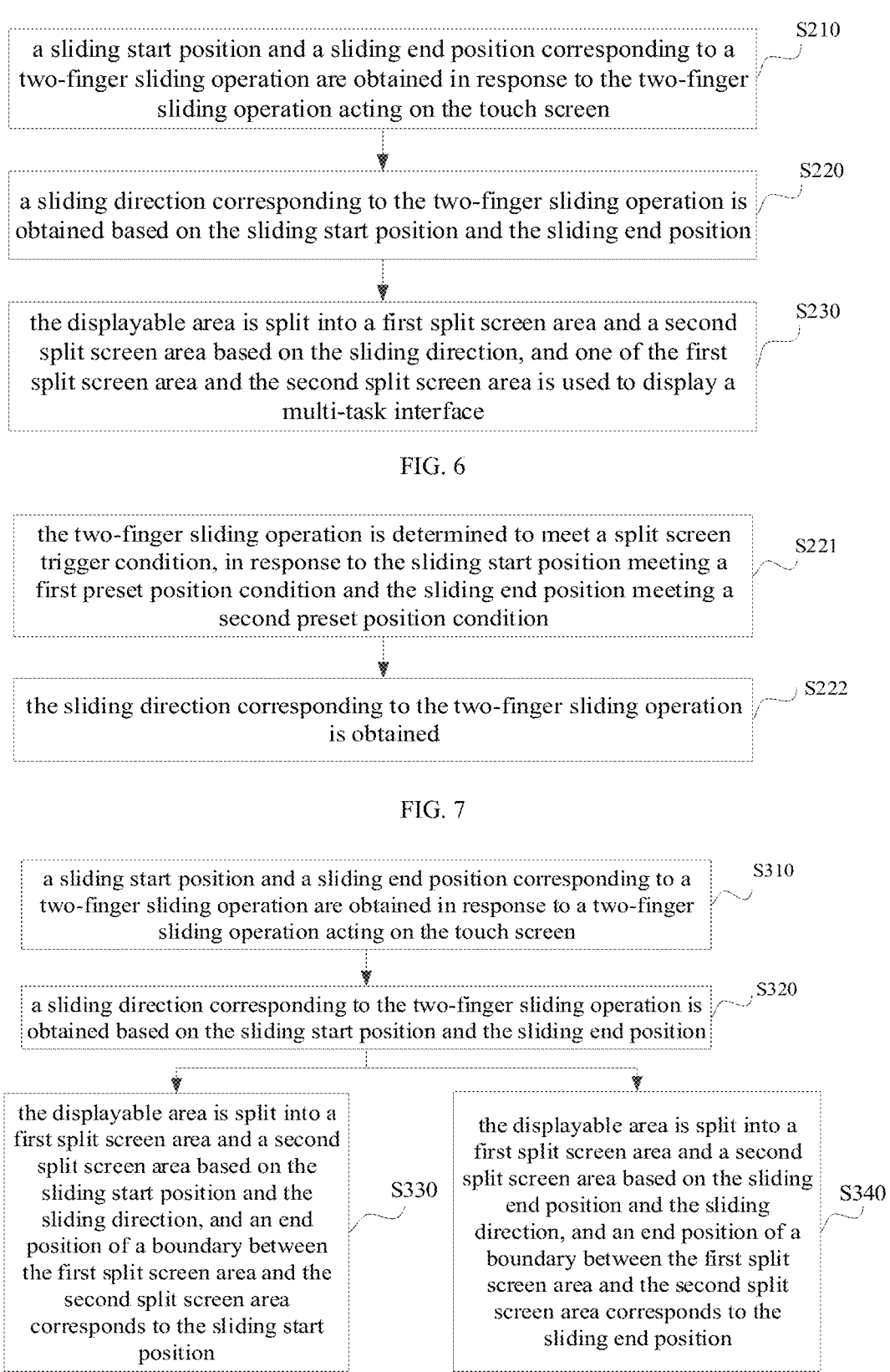

S210 a sliding start position and a sliding end position corresponding to a two-finger sliding operation are obtained in response to the two-finger sliding operation acting on the touch screen

S220 a sliding direction corresponding to the two-finger sliding operation is obtained based on the sliding start position and the sliding end position

S230 the displayable area is split into a first split screen area and a second split screen area based on the sliding direction, and one of the first split screen area and the second split screen area is used to display a multi-task interface

FIG. 6

S221 the two-finger sliding operation is determined to meet a split screen trigger condition, in response to the sliding start position meeting a first preset position condition and the sliding end position meeting a second preset position condition

S222 the sliding direction corresponding to the two-finger sliding operation is obtained

FIG. 7

S310 a sliding start position and a sliding end position corresponding to a two-finger sliding operation are obtained in response to a two-finger sliding operation acting on the touch screen

S320 a sliding direction corresponding to the two-finger sliding operation is obtained based on the sliding start position and the sliding end position

S330 the displayable area is split into a first split screen area and a second split screen area based on the sliding start position and the sliding direction, and an end position of a boundary between the first split screen area and the second split screen area corresponds to the sliding start position

S340 the displayable area is split into a first split screen area and a second split screen area based on the sliding end position and the sliding direction, and an end position of a boundary between the first split screen area and the second split screen area corresponds to the sliding end position

FIG. 8

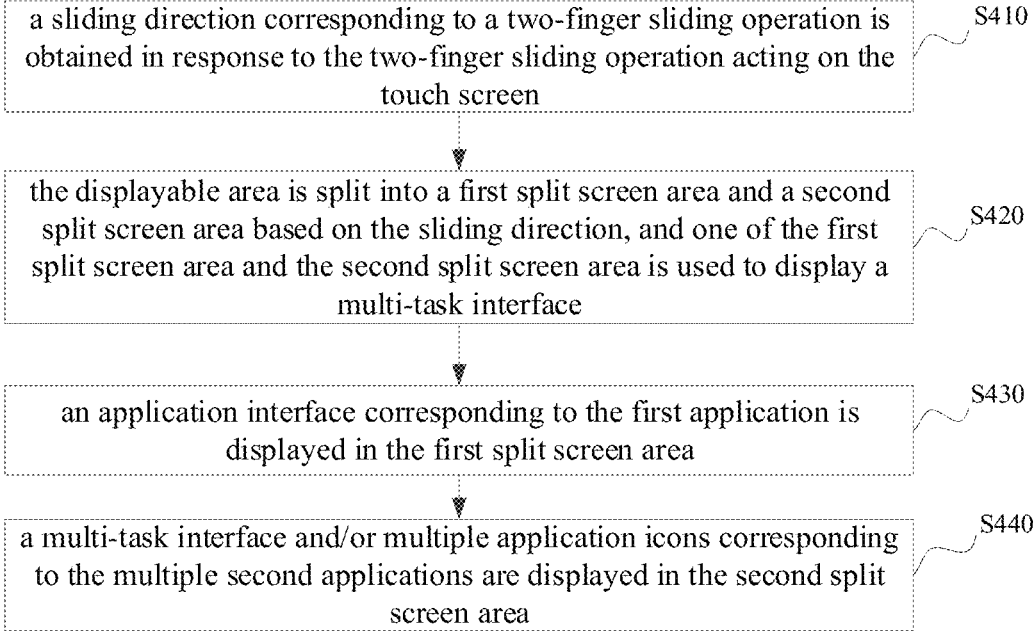

a sliding direction corresponding to a two-finger sliding operation is obtained in response to the two-finger sliding operation acting on the touch screen S410 the displayable area is split into a first split screen area and a second split screen area based on the sliding direction, and one of the first split screen area and the second split screen area is used to display a multi-task interface S420 an application interface corresponding to the first application is displayed in the first split screen area S430 a multi-task interface and/or multiple application icons corresponding to the multiple second applications are displayed in the second split screen area S440

FIG. 13

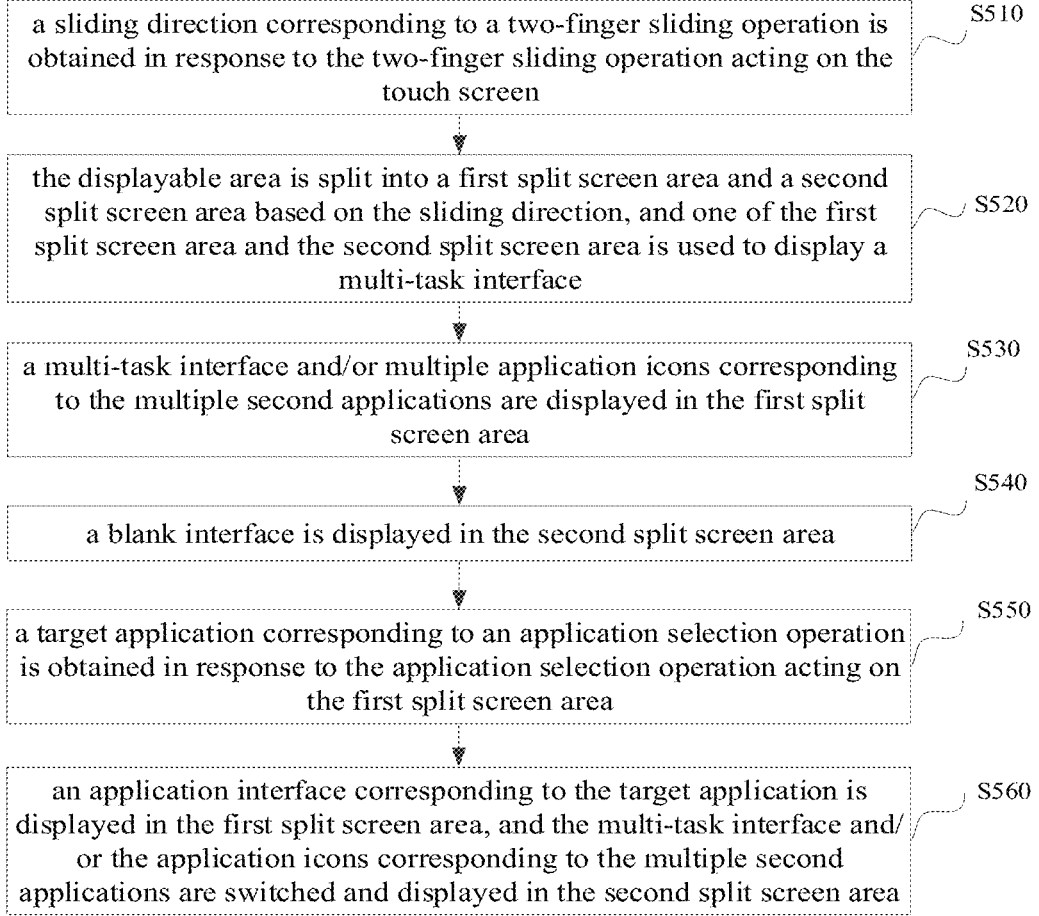

a sliding direction corresponding to a two-finger sliding operation is obtained in response to the two-finger sliding operation acting on the touch screen ⸺ S510 the displayable area is split into a first split screen area and a second split screen area based on the sliding direction, and one of the first split screen area and the second split screen area is used to display a multi-task interface ⸺ S520 a multi-task interface and/or multiple application icons corresponding to the multiple second applications are displayed in the first split screen area ⸺ S530 a blank interface is displayed in the second split screen area ⸺ S540 a target application corresponding to an application selection operation is obtained in response to the application selection operation acting on the first split screen area ⸺ S550 an application interface corresponding to the target application is displayed in the first split screen area, and the multi-task interface and/or the application icons corresponding to the multiple second applications are switched and displayed in the second split screen area ⸺ S560

FIG. 16

| Screen splitting apparatus 200 |
|---|
| Sliding direction obtaining module 210 |
| screen area splitting module 220 |

SCREEN SPLITTING METHOD AND APPARATUS, ELECTRONIC DEVICE, AND STORAGE MEDIUM

CROSS-REFERENCE TO RELATED APPLICATIONS

This application is a continuation of International Application No. PCT/CN2022/070489, filed Jan. 6, 2022, which claims priority to Chinese Patent Application No. 202110158855.7, filed Feb. 4, 2021, the entire disclosures of which are incorporated herein by reference.

TECHNICAL FIELD

The present disclosure relates to the technical field of electronic devices, and in particular to a split screen method, an electronic device, and a storage medium.

BACKGROUND

With a development of science and technology, an electronic device is more and more widely used, has more and more functions, and has become a necessary one of daily life of people. At present, the electronic device generally starts to support a split screen function.

SUMMARY

In view of the above problem, the present disclosure discloses a split screen method, an electronic device, and a storage medium.

In a first aspect, an embodiment of the present disclosure provides a split screen method implemented by an electronic device, the electronic device includes a touch screen, the touch screen includes a displayable area, and the method includes the following steps: a sliding direction corresponding to a two-finger sliding operation is obtained in response to the two-finger sliding operation acting on the touch screen; the displayable area is split, based on the sliding direction, into a first split screen area and a second split screen area; and one of the first split screen area and the second split screen area is configured to display a multi-task interface.

In a second aspect, the preset disclosure provides an electronic device, the electronic device includes a memory and a processor, the memory is coupled to the processor, the memory stores instructions, and the processor is configured, when executing the instructions, to implement the above method.

In a third aspect, the present disclosure provides a non-transitory computer-readable storage medium, the computer-readable storage medium stores program codes, and the program codes are callable by a processor to implement the above method.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to more clearly explain technical solutions of embodiments of the present disclosure, the drawings needed to be used in descriptions of the embodiments will be briefly introduced below. Apparently, the drawings in the following descriptions are only some of the embodiments of the present disclosure, and other drawings can be obtained according to these drawings without creative work for those skilled in the art.

FIG. 1 illustrates a schematic flowchart of a split screen method according to an embodiment of the present disclosure.

FIG. 6 illustrates a schematic flowchart of a split screen method according to another embodiment of the present disclosure.

FIG. 7 illustrates a schematic flowchart of a block S220 of the split screen method illustrated in FIG. 6 of the present disclosure.

FIG. 8 illustrates a schematic flowchart of a split screen method according to still another embodiment of the present disclosure.

FIG. 13 illustrates a schematic flowchart of a split screen method according to even still another embodiment of the present disclosure.

FIG. 16 illustrates a schematic flowchart of a split screen method according to further another embodiment of the present disclosure.

DETAILED DESCRIPTION OF EMBODIMENTS

Figure 2:
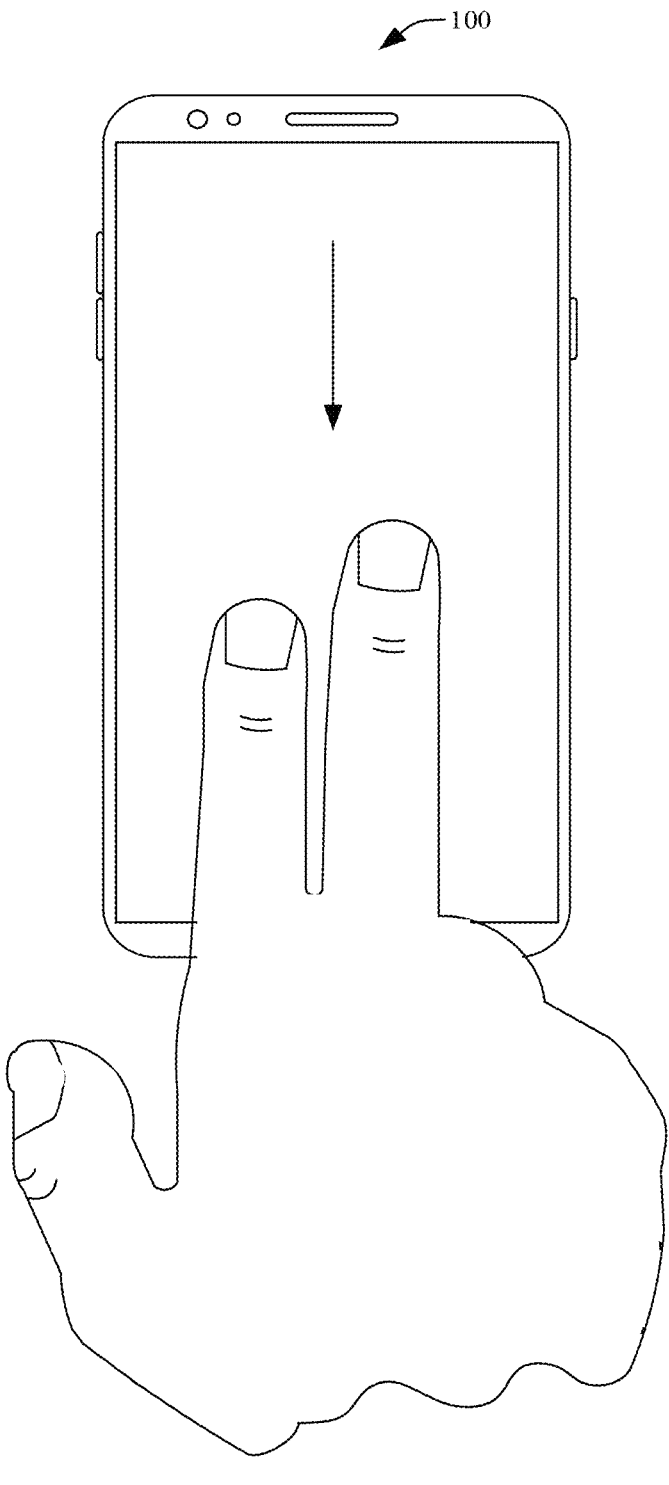
FIG. 2 illustrates a schematic diagram of a first interface of an electronic device according to an embodiment of the present disclosure.

In order to make those skilled in the art better understand the technical solutions of the present disclosure, the technical solutions in the embodiments of the present disclosure will be described clearly and completely with the attached drawings.

At present, an electronic device generally begins to support a split screen function, but an operation process of enabling the split screen function is cumbersome and prone to misoperation. Specifically, at present, methods to trigger the split screen function include sidebar activation, dock activation and multi-task interface activation. The sidebar activation or the dock activation need to trigger a sidebar or a dock bar, then press and hold an application icon displayed in the sidebar or the dock bar, and finally drag the application icon to a corresponding position to trigger the split screen, thus at least three steps need to be performed, and this operation process is cumbersome. Furthermore, this dragging process needs to be accurately positioned and held for a long time, when the dragging position is inaccurate or the long press cannot be maintained, it is easy to cause the misoperation. In addition, a multi-task interface trigger is suitable for switching between tasks and has no direct connection with the split screen, the multi-task interface trigger needs to advance a multi-task interface, then trigger a menu in the multi-task interface, and finally select a split screen option in the menu, thus this method also needs at least three steps, and the operation process is cumbersome.

In view of the above problems, the inventor has discovered through long-term research and put forward a split screen method, a split screen apparatus, an electronic device and a storage medium provided by embodiments of the present disclosure. By obtaining a sliding direction corresponding to a two-finger sliding operation acting on a touch screen and splitting a displayable area of the touch screen based on the sliding direction, operation steps for splitting screen are simplified to improve a split screen speed. The specific split screen method is described in detail in the following embodiments.

An embodiment of the present disclosure provides a split screen method implemented by an electronic device, the electronic device includes a touch screen, the touch screen includes a displayable area, and the method includes: obtaining, in response to a two-finger sliding operation acting on the touch screen, a sliding direction corresponding to the two-finger sliding operation; and splitting, based on the sliding direction, the displayable area into a first split screen area and a second split screen area; and one of the first split screen area and the second split screen area being configured to display a multi-task interface.

According to an embodiment of the present disclosure, the obtaining, in response to a two-finger sliding operation acting on the touch screen, a sliding direction corresponding to the two-finger sliding operation, includes: obtaining, in response to the two-finger sliding operation acting on the touch screen, a sliding start position and a sliding end position corresponding to the two-finger sliding operation; and obtaining, based on the sliding start position and the sliding end position, the sliding direction corresponding to the two-finger sliding operation.

According to an embodiment of the present disclosure, the obtaining, based on the sliding start position and the sliding end position, the sliding direction corresponding to the two-finger sliding operation, includes: determining, in response to the sliding start position meeting a first preset position condition and the sliding end position meeting a second preset position condition, the two-finger sliding operation meeting a split screen trigger condition; and obtaining the sliding direction corresponding to the two-finger sliding operation.

According to an embodiment of the present disclosure, the determining, in response to the sliding start position meeting a first preset position condition and the sliding end position meeting a second preset position condition, the two-finger sliding operation meeting a split screen trigger condition, includes: determining, in response to determining that a distance between the sliding start position and a first edge of the touch screen is less than a first preset distance, and a distance between the sliding end position and a second edge of the touch screen is less than a second preset distance, the two-finger sliding operation meeting the split screen trigger condition; and the first edge is opposite to the second edge.

According to an embodiment of the present disclosure, the splitting, based on the sliding direction, the displayable area into a first split screen area and a second split screen area, includes: splitting, based on the sliding start position and the sliding direction, the displayable area into the first split screen area and the second split screen area; and an end position of a boundary between the first split screen area and the second split screen area corresponding to the sliding start position; or splitting, based on the sliding end position and the sliding direction, the displayable area into the first split screen area and the second split screen area, and an end position of a boundary between the first split screen area and the second split screen area corresponding to the sliding end position.

According to an embodiment of the present disclosure, the obtaining, in response to the two-finger sliding operation acting on the touch screen, a sliding start position and a sliding end position corresponding to the two-finger sliding operation, includes: obtaining, in response to the two-finger sliding operation acting on the touch screen, coordinate information of a sliding starting point corresponding to the two-finger sliding operation, and coordinate information of a sliding ending point corresponding to the two-finger sliding operation; obtaining, based on the coordinate information of the sliding starting point, the sliding start position corresponding to the two-finger sliding operation; and obtaining, based on the coordinate information of the sliding ending point, the sliding end position corresponding to the two-finger sliding operation.

According to an embodiment of the present disclosure, the obtaining, based on the sliding start position and the sliding end position, the sliding direction corresponding to the two-finger sliding operation, includes: obtaining a connecting direction of the sliding start position and the sliding end position; performing angle correction on the connecting direction to obtain a target connecting direction; and obtaining, based on the target connecting direction, the sliding direction corresponding to the two-finger sliding operation.

According to an embodiment of the present disclosure, a foreground of the electronic device runs a first application, and a background of the electronic device runs a plurality of second applications; after the splitting, based on the sliding direction, the displayable area into a first split screen area and a second split screen area, the method includes: displaying an application interface corresponding to the first application in the first split screen area; and displaying a multi-task interface and/or a plurality of application icons corresponding to the plurality of second applications in the second split screen area.

According to an embodiment of the present disclosure, after the displaying a multi-task interface and/or a plurality of application icons corresponding to the plurality of second applications in the second split screen area, the method includes: obtaining, in response to splitting the first split screen area by a two-finger sliding operation acting on the first split screen area, a first sub split screen area and a second sub split screen area.

According to an embodiment of the present disclosure, after obtaining the first sub split screen area and the second sub split screen area, the method includes: enlarging the first sub split screen area and the second sub split screen area to obtain an enlarged first sub split screen area and an enlarged second sub split screen area; the enlarged first sub split screen area and the enlarged second sub split screen area occupying the displayable area; and hiding the multi-task interface and/or the plurality of application icons corresponding to the plurality of second applications.

According to an embodiment of the present disclosure, after the hiding the multi-task interface and/or the plurality of application icons corresponding to the plurality of second applications, the method includes: displaying, in response to a first display switching instruction, an interface corresponding to the enlarged first sub split screen area, and the multi-task interface and/or the plurality of application icons corresponding to the plurality of second applications; and hiding an interface corresponding to the enlarged second sub split screen area.

According to an embodiment of the present disclosure, a foreground of the electronic device does not run an application, and a background of the electronic device runs a plurality of second applications; after the splitting, based on the sliding direction, the displayable area into a first split screen area and a second split screen area, the method includes: displaying a multi-task interface and/or a plurality of application icons corresponding to the plurality of second applications in the first split screen area; and displaying a blank interface in the second split screen area.

According to an embodiment of the present disclosure, after displaying a multi-task interface and/or a plurality of application icons corresponding to the plurality of second applications in the first split screen area, and displaying a blank interface in the second split screen area, the method includes: obtaining, in response to an application selection operation acting on the first split screen area, a target application corresponding to the application selection operation; and displaying an application interface corresponding to the target application in the first split screen area, and switching and displaying the multi-task interface and/or the plurality of application icons corresponding to the plurality of second applications in the second split screen area.

According to an embodiment of the present disclosure, the obtaining, in response to a two-finger sliding operation acting on the touch screen, a sliding direction corresponding to the two-finger sliding operation, includes: detecting, in response to the touch screen being in a lit state, a touch operation acting on the touch screen; and obtaining, in response to the two-finger sliding operation, the sliding direction corresponding to the two-finger sliding operation when the two-finger sliding operation acting on the touch screen is detected.

According to an embodiment of the present disclosure, the detecting, in response to the touch screen being in a lit state, a touch operation acting on the touch screen, includes: detecting, in response to the touch screen is in the lit state and an unlocked state, the touch operation acting on the touch screen.

According to an embodiment of the present disclosure, the detecting, in response to the touch screen is in the lit state and an unlocked state, the touch operation acting on the touch screen, includes: detecting, in response to the touch screen being in the lit state and the unlocked state, a currently displayed interface of the touch screen; and detecting, in response to detecting that the currently displayed interface of the touch screen is a desktop or an application interface, the touch operation acting on the touch screen.

According to an embodiment of the present disclosure, the obtaining, in response to a two-finger sliding operation acting on the touch screen, a sliding direction corresponding to the two-finger sliding operation, includes: obtaining, in response to the two-finger sliding operation acting on the touch screen, a sliding trajectory corresponding to the two-finger sliding operation; and obtaining, based on the sliding trajectory, the sliding direction corresponding to the two-finger sliding operation.

Figures 19, 20:
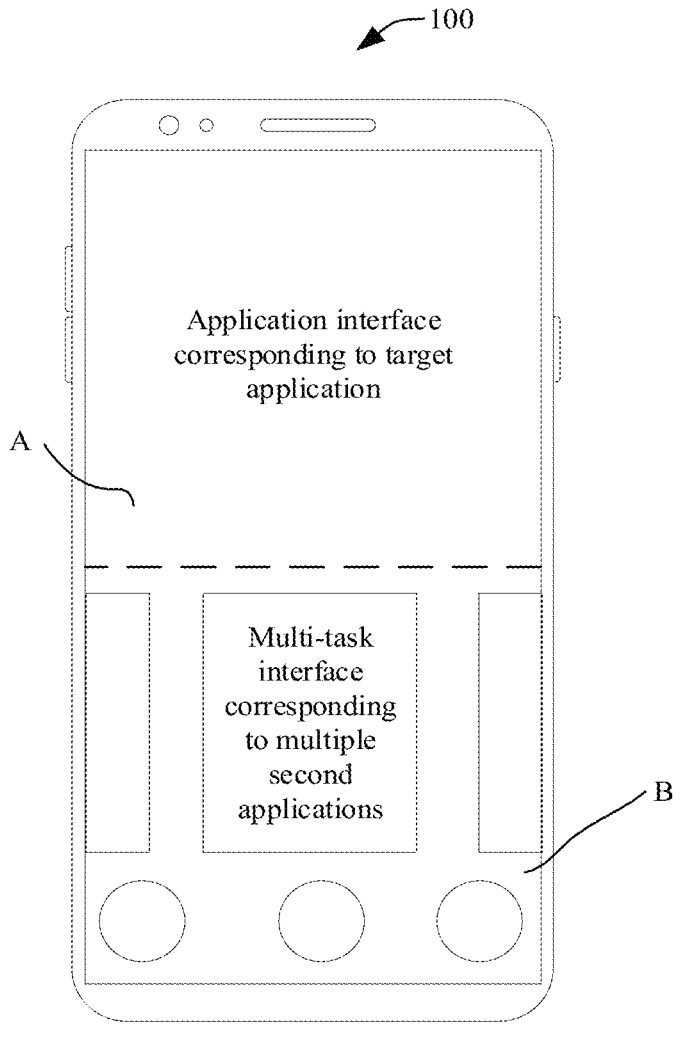
FIG. 19 illustrates a schematic diagram of a thirteenth interface of an electronic device according to an embodiment of the present disclosure.
FIG. 20 illustrates a schematic block diagram of a split screen apparatus according to an embodiment of the present disclosure.

As illustrated in FIG. 1, FIG. 1 illustrates a schematic flowchart of a split screen method according to an embodiment of the present disclosure. The split screen method can simplify operation steps for splitting screen and improve a split screen speed by obtaining a sliding direction corresponding to a two-finger sliding operation acting on a touch screen and splitting a displayable area of the touch screen based on the sliding direction. In some embodiments, the split screen method is implemented by a split screen apparatus 200 as illustrated in FIG. 20 and an electronic device 100 (FIG. 21) equipped with the split screen apparatus 200. Hereinafter, the specific flow of the embodiment will be explained by taking an electronic device as an example. Of course, it can be understood that the electronic device applied in the embodiment can be a smart phone, a tablet computer, a wearable electronic device, etc., and is not limited here. Next, a process illustrated in FIG. 1 will be described in detail. In the embodiment, the electronic device includes a touch screen, and the touch screen includes a displayable area. The split screen method can specifically include the following blocks.

At block S110: a sliding direction corresponding to a two-finger sliding operation is obtained in response to the two-finger sliding operation acting on the touch screen.

In this embodiment, a touch operation acting on the touch screen can be detected, which can include a single-finger clicking operation, a multi-finger clicking operation, a single-finger pressing operation, a single-finger sliding operation, a multi-finger sliding operation, a single-finger long pressing operation, a multi-finger long pressing operation and so on, and is not limited here. When the two-finger sliding operation acting on the touch screen is detected, the sliding direction corresponding to the two-finger sliding operation can be obtained in response to the two-finger sliding operation acting on the touch screen.

In some embodiments, whether the touch screen of the electronic device is in a lit state can be detected, when the touch screen of the electronic device is detected to be in the lit state, the touch operation acting on the touch screen can be detected; when the two-finger sliding operation acting on the touch screen is detected, the sliding direction corresponding to the two-finger sliding operation can be obtained in response to the two-finger sliding operation acting on the touch screen.

In some embodiments, whether the touch screen of the electronic device is in a lit state can be detected, when the touch screen of the electronic device is detected to be in the lit state, whether the touch screen of the electronic device is in an unlocked state can be detected, when the touch screen of the electronic device is detected to be in the unlocked state, the touch operation acting on the touch screen can be detected; and when the two-finger sliding operation acting on the touch screen is detected, the sliding direction corresponding to the two-finger sliding operation can be obtained in response to the two-finger sliding operation acting on the touch screen.

In some embodiments, whether the touch screen of the electronic device is in a lit state can be detected, when the touch screen of the electronic device is detected to be in the lit state, whether the touch screen of the electronic device is in an unlocked state can be detected, when the touch screen of the electronic device is detected to be in the unlocked state, and a currently displayed interface of the touch screen of the electronic device can be detected; and when the currently displayed interface of the electronic device is detected to be a desktop or an application interface, a touch operation acting on the touch screen can be detected, and when the two-finger sliding operation acting on the touch screen is detected, the sliding direction corresponding to the two-finger sliding operation can be obtained in response to the two-finger sliding operation acting on the touch screen.

As a way, when the two-finger sliding operation acting on the touch screen is detected, a sliding trajectory corresponding to the two-finger sliding operation can be obtained in response to the two-finger sliding operation, and the sliding direction corresponding to the two-finger sliding operation can be obtained based on the sliding trajectory corresponding to the two-finger sliding operation. As another way, when the two-finger sliding operation acting on the touch screen is detected, a sliding start position and a sliding end position corresponding to the two-finger sliding operation can be obtained in response to the two-finger sliding operation, and the sliding direction corresponding to the two-finger sliding operation can be obtained based on the sliding start position and the sliding end position.

At block S120, the displayable area is split into a first split screen area and a second split screen area based on the sliding direction, and one of the first split screen area and the second split screen area is used to display a multi-task interface.

In this embodiment, after obtaining the sliding direction corresponding to the two-finger sliding operation, the displayable area of the touch screen can be split into the first split screen area and the second split screen area based on the sliding direction. A shape of the first split screen area and a shape of the second split screen area may be the same or different. A size of the first split screen area and a size of the second split screen area may be the same or different. A boundary of the first split screen area can be a regular line (such as a straight line) or an irregular line (such as a curved line). A position of the first split screen area may be located above a position of the second split screen area, or below a position of the second split screen area, or at a left of a position of the second split screen area, or at a right of a position of the second split screen area, etc., which is not limited here.

Figure 3:
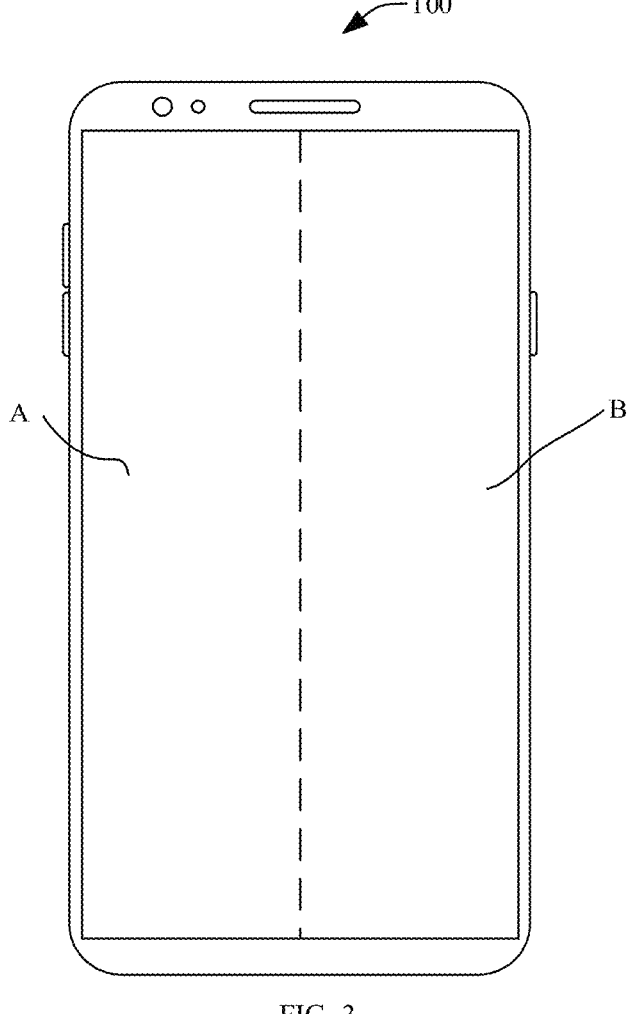
FIG. 3 illustrates a schematic diagram of a second interface of an electronic device according to an embodiment of the present disclosure.

As illustrated in FIG. 2 and FIG. 3, FIG. 2 illustrates a schematic diagram of a first interface of an electronic device according to an embodiment of the present disclosure, and FIG. 3 illustrates a schematic diagram of a second interface of an electronic device according to an embodiment of the present disclosure. As illustrated in FIG. 2, when two fingers slide from a top of a touch screen to a bottom of the touch screen, a displayable area of the touch screen can be split into left and right areas, that is, the displayable area can be split into a first split screen area A and a second split screen area B (as illustrated in FIG. 3).

Figure 4:
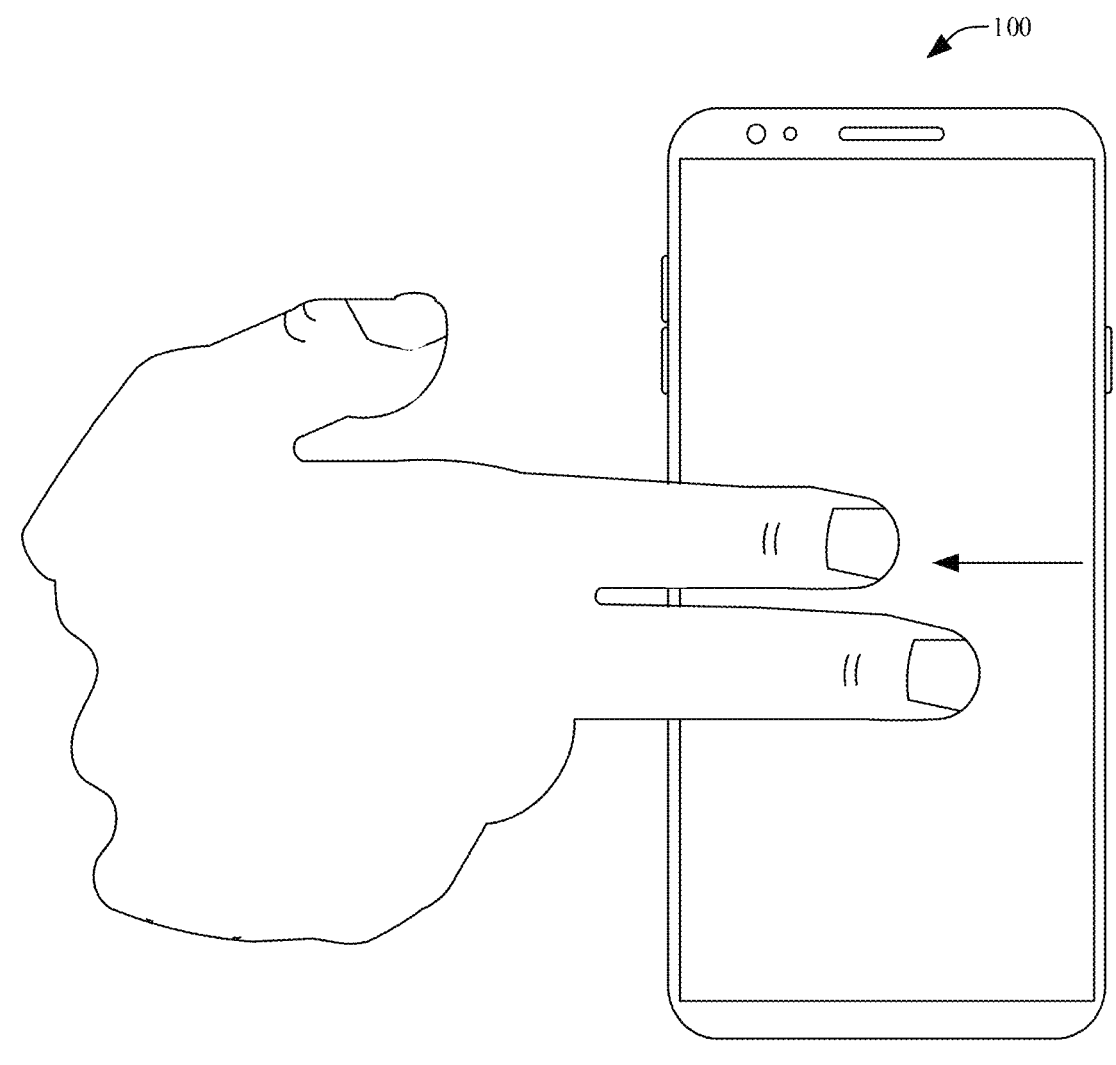
FIG. 4 illustrates a schematic diagram of a third interface of an electronic device according to an embodiment of the present disclosure.
Figure 5:
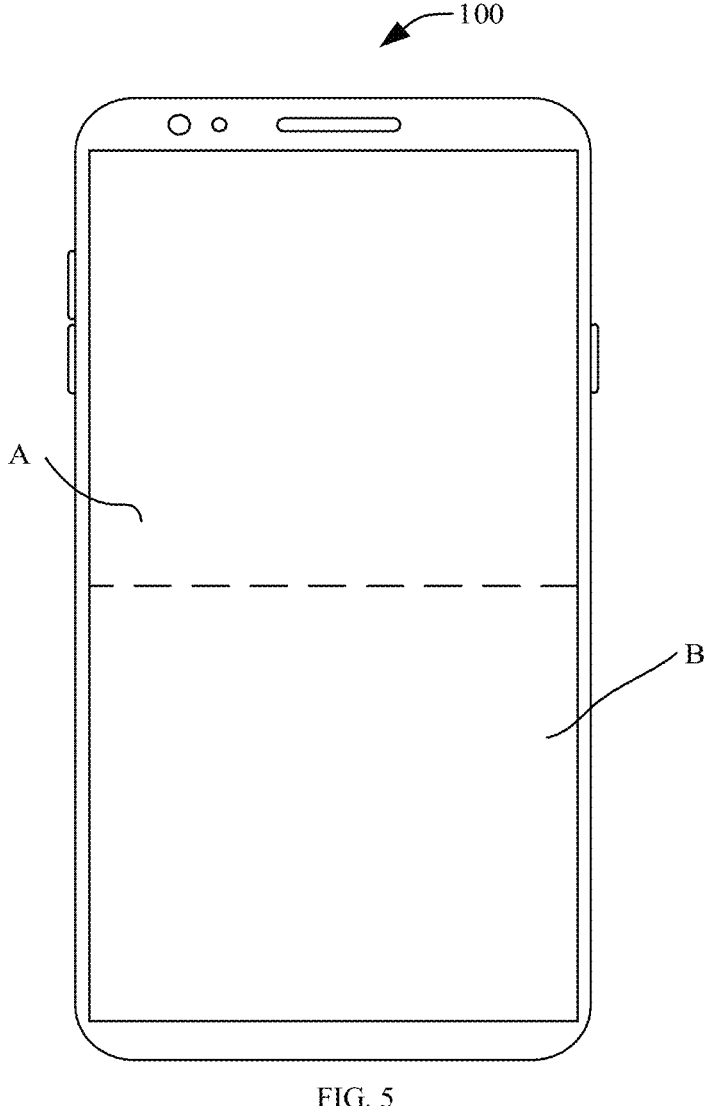
FIG. 5 illustrates a schematic diagram of a fourth interface of an electronic device according to an embodiment of the present disclosure.

As illustrated in FIG. 4 and FIG. 5, FIG. 4 illustrates a schematic diagram of a third interface of an electronic device according to an embodiment of the present disclosure, and FIG. 5 illustrates a schematic diagram of a fourth interface of an electronic device according to an embodiment of the present disclosure. As illustrated in FIG. 4, when two fingers slide from a right side of a touch screen to a left side of the touch screen, a displayable area of the touch screen can be split into up and down areas, that is, the displayable area can be split into a first split screen area A and a second split screen area B (as illustrated in FIG. 5).

In some embodiments, one of the first split screen area and the second split screen area obtained by splitting the displayable area is used to display a multi-task interface, and the multi-task interface can be used to display a window corresponding to at least one application.

As a first way, the first split screen area can be used to display an application interface corresponding to an application, and the second split screen area can be used to display a multi-task interface; or the first split screen area can be used to display a multi-task interface, and the second split screen area can be used to display an application interface corresponding to an application.

As a second way, the first split screen area can be used to display a multi-task interface, and the second split screen area can be used to display a blank interface; or the first split screen area can be used to display a blank interface, and the second split screen area can be used to display a multi-task interface.

As a third way, the first split screen area can be used to display an application interface corresponding to an application, and the second split screen area can be used to display a multi-task interface and an application icon; or the first split screen area can be used to display a multi-task interface and an application icon, and the second split screen area can be used to display an application interface corresponding to an application.

As a fourth way, the first split screen area can be used to display a multi-task interface and an application icon, and the second split screen area can be used to display a blank interface; or the first split screen area can be used to display a blank interface and the second split screen area can be used to display a multi-task interface and an application icon.

In some embodiments, after obtaining the sliding direction corresponding to the two-finger sliding operation, a split screen direction can be determined according to the sliding direction. As a way, the electronic device can preset mapping relationships between multiple sliding directions and multiple split screen directions, and store the mapping relationships between multiple sliding directions and multiple split screen directions in a mapping relationship table. Based on this, after obtaining the sliding direction corresponding to the two-finger sliding operation, the sliding direction corresponding to the two-finger sliding operation can be obtained from the multiple sliding directions in the mapping relationship table as a target sliding direction. Then, based on the mapping relationships between multiple sliding directions and multiple split screen directions, a split screen direction with a mapping relationship with the target sliding direction is determined from the multiple split screen directions as a target split screen direction, and then the target split screen direction can be determined as a split screen direction corresponding to the sliding direction corresponding to the two-finger sliding operation.

In some embodiments, when it is determined that the sliding direction corresponding to the two-finger sliding operation is parallel to a longitudinal axis direction of the electronic device, the split screen direction can be determined to be parallel to the longitudinal axis direction of the electronic device, that is, the displayable area of the touch screen of the electronic device is split left and right. When it is determined that the sliding direction corresponding to the two-finger sliding operation is parallel to a transverse axis direction of the electronic device, the split screen direction can be determined to be parallel to the transverse axis direction of the electronic device, that is, the displayable area of the touch screen of the electronic device is split up and down. When it is determined that the sliding direction corresponding to the two-finger sliding operation is parallel to a diagonal direction of the electronic device, the split screen direction can be determined to be parallel to the diagonal direction of the electronic device, that is, the displayable area of the touch screen of the electronic device is diagonally split.

In some embodiments, the electronic device can be preset and stored with a specified direction, and the specified direction is set as the longitudinal axis direction or the transverse axis direction of the electronic device. Then, when the sliding direction is parallel to the longitudinal axis direction of the electronic device, the longitudinal axis direction of the electronic device is determined as a split screen direction, and the displayable area of the touch screen can be split left and right based on the split screen direction. When the sliding direction is parallel to the transverse axis direction of the electronic device, the transverse axis direction of the electronic device is determined as a split screen direction, and the displayable area of the touch screen can be split up and down based on the split screen direction.

Taking a split screen direction as a longitudinal axis direction of the electronic device as an example, when two fingers slide from a top to a bottom or from a bottom to a top of the touch screen, the displayable area of the touch screen can be split left and right. Taking a split screen direction as a transverse axis direction of the electronic device as an example, when two fingers slide from a left edge to a right edge of the touch screen or from a right edge to a left edge of the touch screen, the displayable area of the touch screen can be split up and down.

According to the split screen method provided by the embodiment of the disclosure, the sliding direction corresponding to the two-finger sliding operation acting on the touch screen is obtained in response to the two-finger sliding operation acting on the touch screen, the displayable area is split into the first split screen area and the second split screen area based on the sliding direction, and one of the first split screen area and the second split screen area is used to display the multi-task interface, thus by obtaining the sliding direction corresponding to the two-finger sliding operation acting on the touch screen and splitting the displayable area of the touch screen based on the sliding direction, operation steps for splitting screen are simplified to improve a split screen speed.

As illustrated in FIG. 6, FIG. 6 illustrates a schematic flowchart of a split screen method according to another embodiment of the present disclosure. Next, a process illustrated in FIG. 6 will be described in detail. This method is implemented by the above-mentioned electronic device, which includes the touch screen, and the touch screen includes the displayable area. The split screen method can specifically include the following blocks.

At block S210: a sliding start position and a sliding end position corresponding to a two-finger sliding operation are obtained in response to the two-finger sliding operation acting on the touch screen.

In this embodiment, when the two-finger sliding operation acting on the touch screen is detected, the sliding start position and the sliding end position corresponding to the two-finger sliding operation can be obtained in response to the two-finger sliding operation. As a way, the electronic device can include a contact sensor and/or a pressure sensor, and when the two-finger sliding operation acting on the touch screen is detected by the contact sensor and/or the pressure sensor, the sliding start position and the sliding end position corresponding to the two-finger sliding operation can be obtained by the contact sensor and/or the pressure sensor in response to the two-finger sliding operation.

In some embodiments, when it is detected that two fingers acting on the touch screen start sliding, coordinate information of a sliding starting point corresponding to the two-finger sliding operation can be obtained, and the sliding start position corresponding to the two-finger sliding operation can be obtained based on the coordinate information of the sliding starting point corresponding to the two-finger sliding operation. When it is detected that the two fingers acting on the touch screen end sliding, coordinate information of a sliding ending point corresponding to the two-finger sliding operation can be obtained, and the sliding end position corresponding to the two-finger sliding operation can be obtained based on the coordinate information of the sliding ending point corresponding to the two-finger sliding operation.

At block S220, a sliding direction corresponding to the two-finger sliding operation is obtained based on the sliding start position and the sliding end position.

In this embodiment, after obtaining the sliding start position and the sliding end position corresponding to the two-finger sliding operation, the sliding direction corresponding to the two-finger sliding operation can be obtained based on the sliding start position and the sliding end position.

In some embodiments, after obtaining the sliding start position and the sliding end position corresponding to the two-finger sliding operation, a connecting direction of the sliding start position and the sliding end position can be obtained, and the sliding direction corresponding to the two-finger sliding operation can be obtained based on the connecting direction.

In some embodiments, after obtaining the sliding start position and the sliding end position corresponding to the two-finger sliding operation, a connecting direction of the sliding start position and the sliding end position can be obtained, the connecting direction can be corrected by a small angle to obtain a target connecting direction, and the sliding direction corresponding to the two-finger sliding operation can be obtained based on the target connecting direction. The target connecting direction is parallel to the longitudinal axis direction of the electronic device or parallel to the transverse axis direction of the electronic device.

In some embodiments, the touch screen includes a first edge and a second edge which are oppositely arranged, and a third edge and a fourth edge which are oppositely arranged. After obtaining the sliding start position and sliding end position corresponding to the two-finger sliding operation, the sliding start position and sliding end position are compared with the first edge, the second edge, the third edge and the fourth edge. When the sliding start position is located at or near the first edge and the sliding end position is located at or near the second edge, it can be determined that the sliding direction corresponding to the two-finger sliding operation is perpendicular to the first edge and the second edge. When the sliding start position is located at or near the third edge and the sliding end position is located at or near the fourth edge, it can be determined that the sliding direction corresponding to the two-finger sliding operation is perpendicular to the third edge and the fourth edge.

As illustrated in FIG. 7, FIG. 7 illustrates a schematic flowchart of the block S220 of the split screen method illustrated in FIG. 6 of the present disclosure. A process illustrated in FIG. 7 will be described in detail below, and the process can specifically include the following blocks.

At block S221, the two-finger sliding operation is determined to meet a split screen trigger condition, in response to the sliding start position meeting a first preset position condition and the sliding end position meeting a second preset position condition.

In some embodiments, the electronic device can preset and store the first preset position condition and the second preset position condition, the first preset position condition is used as a basis for determining the sliding start position and the second preset position condition is used as a basis for determining the sliding end position. Therefore, in this embodiment, after obtaining the sliding start position, the sliding start position can be compared with the first preset position condition to determine whether the sliding start position meets the first preset position condition, and after obtaining the sliding end position, the sliding end position can be compared with the second preset position condition to determine whether the sliding end position meets the second preset position condition.

When it is determined that the sliding start position meets the first preset position condition and the sliding end position meets the second preset position condition, it can be determined that the two-finger sliding operation meets the split screen trigger condition. When it is determined that the sliding start position does not meet the first preset position condition and/or the sliding end position does not meet the second preset position condition, it can be determined that the two-finger sliding operation does not meet the split screen trigger condition. By setting the split screen trigger condition, the possibility of misoperation can be reduced.

In some embodiments, the touch screen of the electronic device includes a first edge and a second edge which are oppositely arranged, the electronic device can preset and store a first preset distance and a second preset distance, the first preset distance is used as a basis for determining a distance between the sliding start position and the first edge of the touch screen, and the second preset distance is used as a basis for determining a distance between the sliding end position and the second edge. Therefore, in this embodiment, after obtaining the sliding start position, the distance between the sliding start position and the first edge of the touch screen can be calculated, and the distance between the sliding start position and the first edge of the touch screen can be compared with the first preset distance to determine whether the distance between the sliding start position and the first edge of the touch screen is less than the first preset distance, and after obtaining the sliding end position, the distance between the sliding end position and the second edge of the touch screen can be calculated, and the distance between the sliding end position and the second edge of the touch screen can be compared with the second preset distance to determine whether the distance between the sliding end position and the second edge of the touch screen is less than the second preset distance.

When it is determined that the distance between the sliding start position and the first edge of the touch screen is less than the first preset distance, it can be determined that the sliding start position meets the first preset position condition, and when it is determined that the distance between the sliding end position and the second edge of the touch screen is less than the second preset distance, it can be determined that the sliding end position meets the second preset position condition, thus it can be determined that the two-finger sliding operation meets the split screen trigger condition.

In some embodiments, when the sliding start position meets the first preset position condition and the sliding end position meets the second preset position condition, a sliding distance corresponding to the two-finger sliding operation can be obtained, and when the sliding distance is greater than a preset distance, it is determined that the two-finger sliding operation meets the split screen trigger condition.

In some embodiments, when the sliding start position meets the first preset position condition and the sliding end position meets the second preset position condition, a sliding trajectory corresponding to the two-finger sliding operation can be obtained. When the sliding trajectory indicates that the two-finger sliding operation slides for a first preset distance in a preset direction and then slides for a second preset distance in a opposite direction, it is determined that the two-finger sliding operation meets the split screen trigger condition.

At block S222, the sliding direction corresponding to the two-finger sliding operation is obtained.

In this embodiment, when it is determined that the two-finger sliding operation meets the split screen trigger condition, the sliding direction corresponding to the two-finger sliding operation is obtained, which can reduce the probability of misoperation.

At block S230, the displayable area is split into a first split screen area and a second split screen area based on the sliding direction, and one of the first split screen area and the second split screen area is used to display a multi-task interface.

For a detailed description of the block S230, please refer to the block S120, which is not repeated here.

According to the split screen method provided by the another embodiment of the present disclosure, the sliding start position and the sliding end position corresponding to the two-finger sliding operation are obtained in response to the two-finger sliding operation acting on the touch screen, the sliding direction corresponding to the two-finger sliding operation is obtained based on the sliding start position and the sliding end position, the displayable area is split into the first split screen area and the second split screen area based on the sliding direction, and one of the first split screen area and the second split screen area is used to display the multi-task interface. Compared with the split screen method illustrated in FIG. 1, this embodiment obtains the sliding start position and sliding end position corresponding to the two-finger sliding operation and obtains the sliding direction corresponding to the two-finger sliding operation based on the sliding start position and sliding end position, thereby improving the accuracy of the obtained sliding direction.

As illustrated in FIG. 8, FIG. 8 illustrates a schematic flowchart of a split screen method according to still another embodiment of the present disclosure. Next, a process illustrated in FIG. 8 will be described in detail. This method is implemented by the above-mentioned electronic device, which includes the touch screen, and the touch screen includes the displayable area. The split screen method can specifically include the following blocks.

At block S310: a sliding start position and a sliding end position corresponding to a two-finger sliding operation are obtained in response to a two-finger sliding operation acting on the touch screen.

At block S320: a sliding direction corresponding to the two-finger sliding operation is obtained based on the sliding start position and the sliding end position.

For the detailed description of the blocks S310-S320, please refer to the blocks S210-S220, which will not be repeated here.

At block S330: the displayable area is split into a first split screen area and a second split screen area based on the sliding start position and the sliding direction, and an end position of a boundary between the first split screen area and the second split screen area corresponds to the sliding start position.

In some embodiments, the displayable area of the touch screen can be split into the first split screen area and the second split screen area based on the sliding start position and the sliding direction, thereby making one of end positions of the boundary between the first split screen area and the second split screen area correspond to the sliding start position. In some embodiments, when the sliding start position splits a first edge of the touch screen into four proportions and six proportions, a ratio of the first split screen area to the second split screen area obtained by splitting the displayable area of the touch screen based on the sliding start position and the sliding direction can be four to six. In some embodiments, when the sliding start position splits the first edge of the touch screen into three proportions and seven proportions, a ratio of the first split screen area to the second split screen area obtained by splitting the displayable area of the touch screen based on the sliding start position and the sliding direction can be three to seven.

Figure 9:
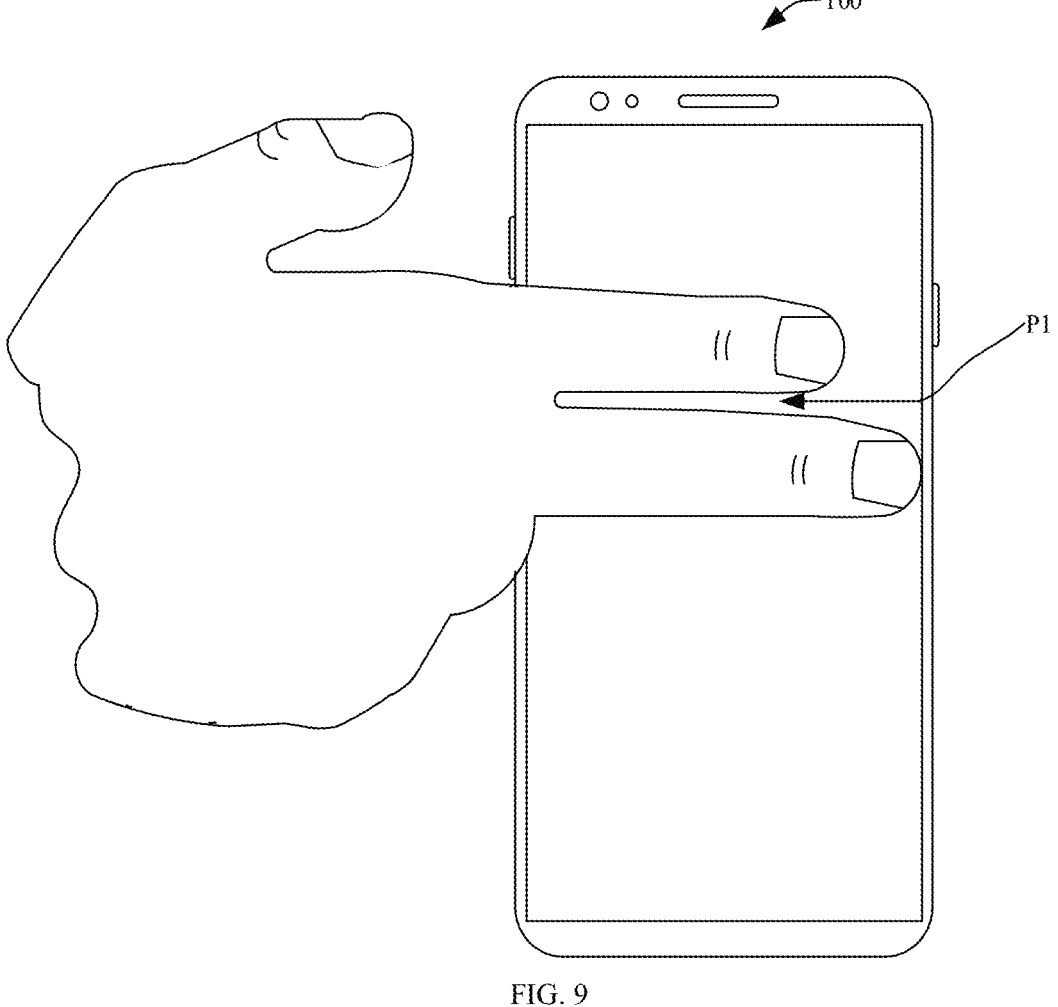
FIG. 9 illustrates a schematic diagram of a fifth interface of an electronic device according to an embodiment of the present disclosure.
Figure 10:
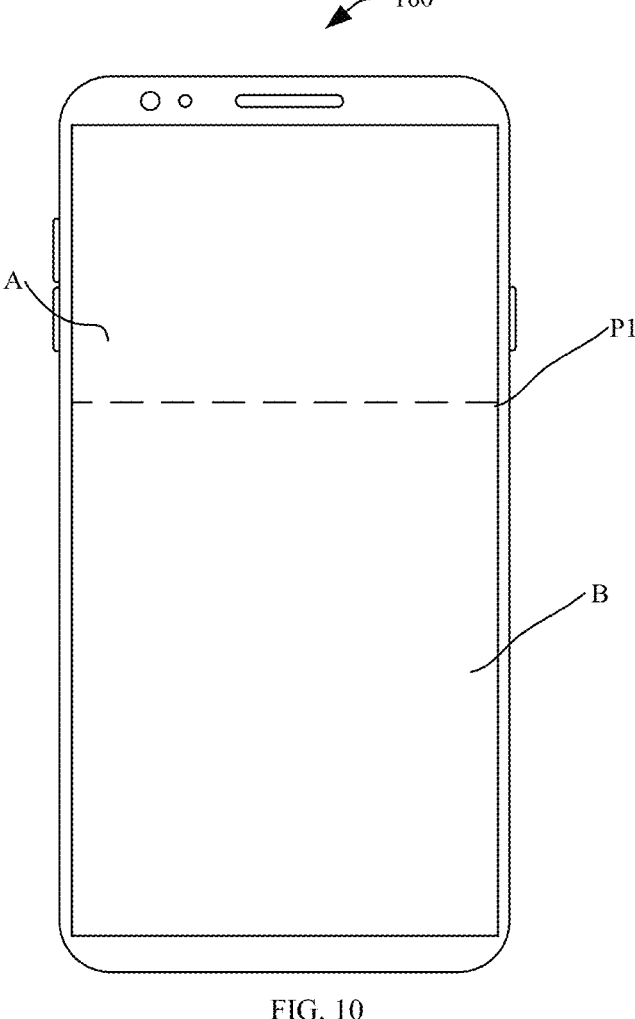
FIG. 10 illustrates a schematic diagram of a sixth interface of an electronic device according to an embodiment of the present disclosure.

As illustrated in FIGS. 9 and 10, FIG. 9 illustrates a schematic diagram of a fifth interface of an electronic device according to an embodiment of the present disclosure, and FIG. 10 illustrates a schematic diagram of a sixth interface of an electronic device according to an embodiment of the present disclosure. As illustrated in FIG. 9, when a sliding start position corresponding to the two-finger sliding operation is P1, an end position of a boundary between a first split screen area A and a second split screen area B corresponds to the sliding start position P1 (as illustrated in FIG. 10).

At block S340: the displayable area is split into a first split screen area and a second split screen area based on the sliding end position and the sliding direction, and an end position of a boundary between the first split screen area and the second split screen area corresponds to the sliding end position.

In some embodiments, the displayable area of the touch screen can be split into the first split screen area and the second split screen area based on the sliding end position and the sliding direction, thereby making one of end positions of the boundary between the first split screen area and the second split screen area correspond to the sliding end position. In some embodiments, when the sliding end position splits a second edge of the touch screen into four proportions and six proportions, a ratio of the first split screen area and the second split screen area obtained by splitting the displayable area of the touch screen based on the sliding end position and the sliding direction can be four to six. In some embodiments, when the sliding end position splits the second edge of the touch screen into three proportions and seven proportions, a ratio of the first split screen area to the second split screen area obtained by splitting the displayable area of the touch screen based on the sliding end position and the sliding direction can be three to seven.

Figure 11:
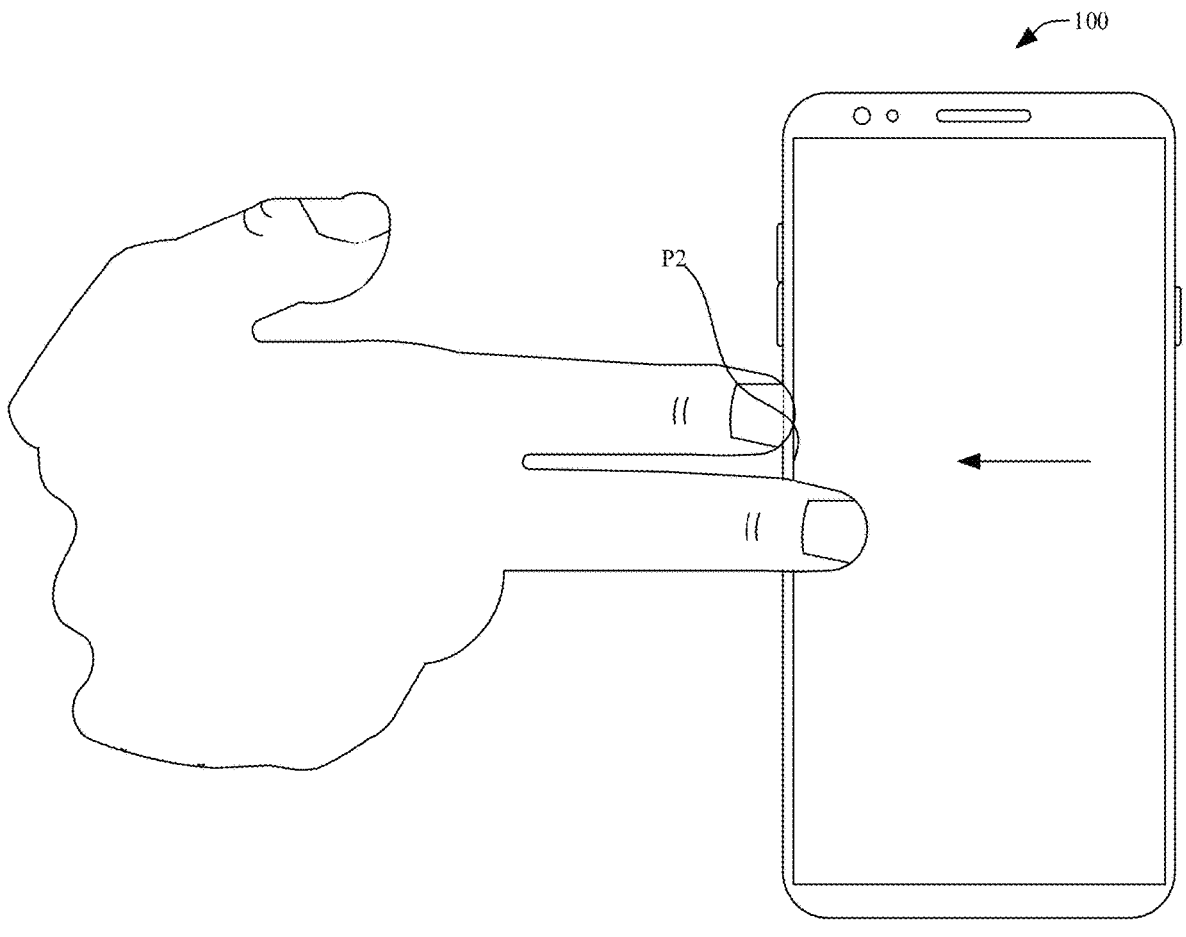
FIG. 11 illustrates a schematic diagram of a seventh interface of an electronic device according to an embodiment of the present disclosure.
Figure 12:
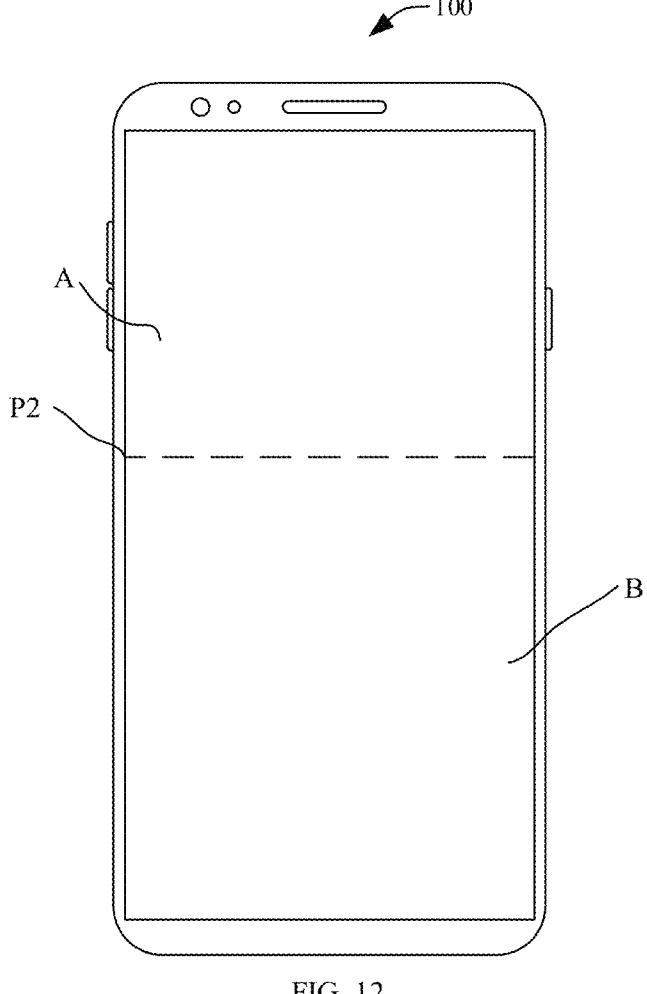
FIG. 12 illustrates a schematic diagram of an eighth interface of an electronic device according to an embodiment of the present disclosure.

As illustrated in FIGS. 11 and 12, FIG. 11 illustrates a schematic diagram of a seventh interface of an electronic device according to an embodiment of the present disclosure, and FIG. 12 illustrates a schematic diagram of an eighth interface of an electronic device according to an embodiment of the present disclosure. As illustrated in FIG. 11, when the sliding end position corresponding to the two-finger sliding operation is P2, one end position of a boundary between a first split screen area A and a second split screen area B obtained by splitting the displayable area corresponds to the sliding end position P2 (as illustrated in FIG. 12).

According to the split screen method provided by the still another embodiment of the present disclosure, the sliding start position and the sliding end position corresponding to the two-finger sliding operation are obtained in response to the two-finger sliding operation acting on the touch screen, the sliding direction corresponding to the two-finger sliding operation is obtained based on the sliding start position and the sliding end position, and the displayable area is split into the first split screen area and the second split screen area based on the sliding start position and the sliding direction, one of end positions of the boundary between the first split screen area and the second split screen area corresponds to the sliding start position, or the displayable area is split into the first split screen area and the second split screen area based on the sliding end position and the sliding direction, and one of end positions of the boundary between the first split screen area and the second split screen area corresponds to the sliding end position. Compared with the split screen method illustrated in FIG. 1, this embodiment splits the displayable area based on the sliding start position or the sliding end position, so as to improve the interactive experience of users.

As illustrated in FIG. 13, FIG. 13 illustrates a schematic flowchart of a split screen method according to even still another embodiment of the present disclosure. Next, a process illustrated in FIG. 13 will be described in detail. This method is implemented by the above-mentioned electronic device, which includes the touch screen, and the touch screen includes the displayable area. In this embodiment, a first application runs in a foreground of the electronic device, and multiple second applications run in a background of the electronic device. The split screen method can specifically include the following blocks.

At block S410: a sliding direction corresponding to a two-finger sliding operation is obtained in response to the two-finger sliding operation acting on the touch screen.

At block S420: the displayable area is split into a first split screen area and a second split screen area based on the sliding direction, and one of the first split screen area and the second split screen area is used to display a multi-task interface.

For the detailed description of the blocks S410-S420, please refer to the blocks S110-S120, which will not be repeated here.

At block S430: an application interface corresponding to the first application is displayed in the first split screen area.

At block S440: a multi-task interface and/or multiple application icons corresponding to the multiple second applications are displayed in the second split screen area.

In this embodiment, the first application runs in the foreground of the electronic device, and the multiple second applications run in the background of the electronic device. Based on this, after the displayable area of the touch screen is split into the first split screen area and the second split screen area, the application interface corresponding to the first application program can be displayed in the first split screen area, and the multi-task interface and/or the multiple application icons corresponding to the multiple second applications can be displayed in the second split screen area.

Figure 14:
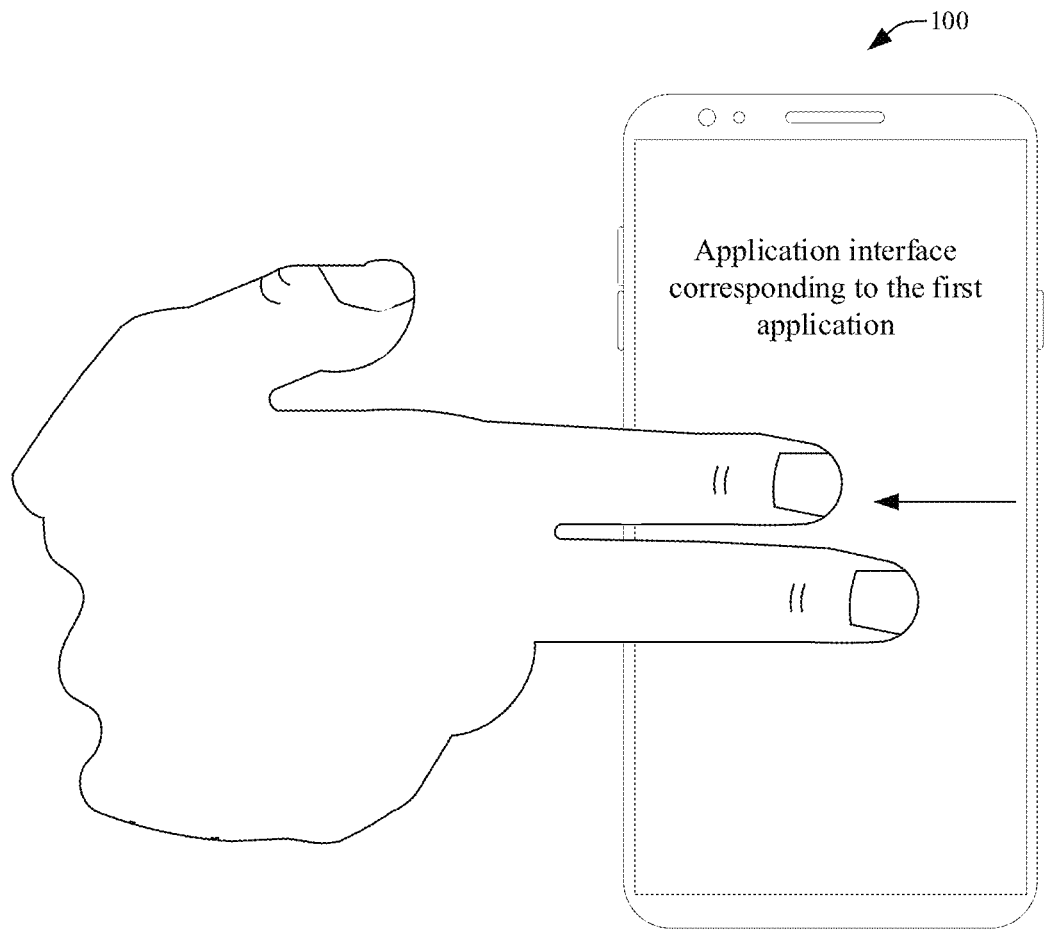
FIG. 14 illustrates a schematic diagram of a ninth interface of an electronic device according to an embodiment of the present disclosure.
Figure 15:
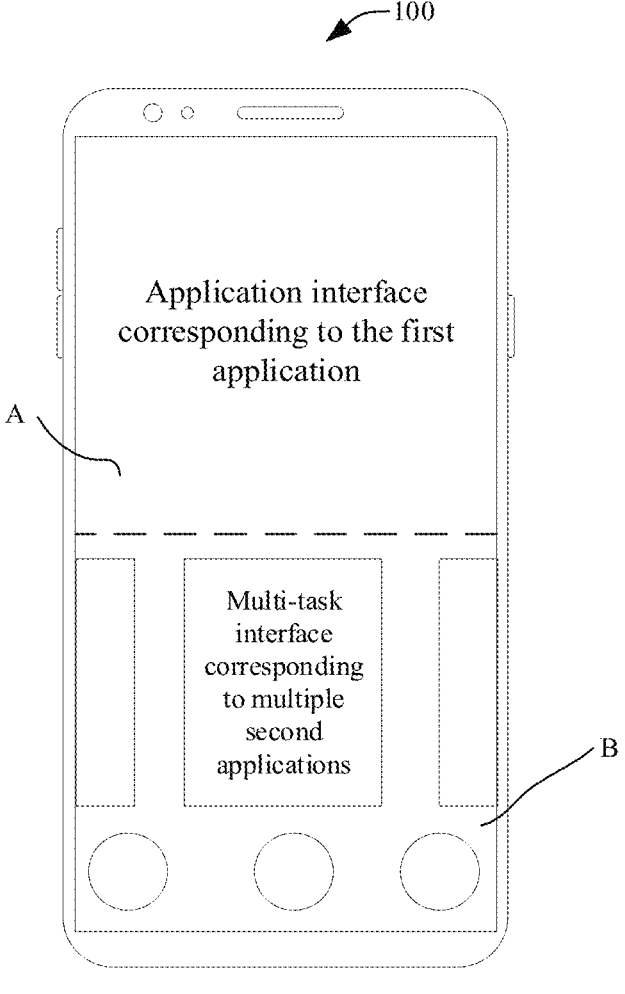
FIG. 15 illustrates a schematic diagram of a tenth interface of an electronic device according to an embodiment of the present disclosure.

As illustrated in FIGS. 14 and 15, FIG. 14 illustrates a schematic diagram of a ninth interface of an electronic device according to an embodiment of the present disclosure, and FIG. 15 illustrates a schematic diagram of a tenth interface of an electronic device according to an embodiment of the present disclosure. As illustrated in FIG. 14, for the case that a first application runs in a foreground of the electronic device and multiple second applications runs in a background of the electronic device, when a displayable area of a touch screen is split into a first split screen area A and a second split screen area B, an application interface corresponding to the first application can be displayed in the first split screen area A, and a multi-task interface and multiple application icons corresponding to the multiple second applications can be displayed in the second split screen area B (as illustrated in FIG. 15).

In some embodiments, when a selection operation acting on the multi-task interface or the multiple application icons corresponding to the multiple second applications is detected, a target application corresponding to the selection operation can be obtained, and an application interface corresponding to the target application can be displayed in the second split screen area. At this time, the first split screen area displays the application interface corresponding to the first application, and the second split screen area displays the application interface corresponding to the target application.

In some embodiments, after displaying the application interface corresponding to the first application in the first split screen area, and displaying the multi-task interface and/or the multiple application icons corresponding to the multiple second applications in the second split screen area, the first split screen area can be split in response to a two-finger sliding operation acting on the first split screen area to obtain a first sub split screen area and a second sub split screen area, the first and second sub split screen areas are enlarged to obtain enlarged first and second sub split screen areas, and the enlarged first and second sub split screen areas occupy the displayable area. At this time, the enlarged first sub split screen area can display the application interface corresponding to the first application, and the enlarged second sub split screen area also can display the application interface corresponding to the first application and hide the multi-task interface and/or the multiple application icons corresponding to the multiple second applications. Afterwards, when receiving a first display switching instruction, the interface corresponding to the enlarged first sub split screen area and the multi-task interface and/or the multiple application icons corresponding to the multiple second applications corresponding to the second sub split screen area can be displayed, and the interface corresponding to the enlarged second sub split screen area can be hidden.

In some embodiments, after splitting the displayable area of the touch screen into the first and second split screen areas, the first and second split screen areas can be split in response to two-finger sliding operations acting on the first and second split screen areas to obtain third, fourth, fifth, and sixth sub split screen areas.

According to the split screen method provided by the even still another embodiment of the present disclosure, the sliding direction corresponding to the two-finger sliding operation is obtained in response to the two-finger sliding operation acting on the touch screen, the displayable area is split into the first split screen area and the second split screen area based on the sliding direction, one of the first and second split screen areas is used to display the multi-task interface, the application interface corresponding to the first application is displayed in the first split screen area, and the multi-task interface and/or the multiple application icons corresponding to the multiple second applications are displayed in the second split screen area. Compared to the split screen method illustrated in FIG. 1, this embodiment runs the first application in the foreground of the electronic device and the multiple second applications in the background, after obtaining the first split screen area and the second split screen area, the application interface corresponding to the first application is displayed in the first split screen area, and the multi-task interface and/or the multiple application icons corresponding to the multiple second applications are displayed in the second split screen area, thereby improving an split screen display effect.

As illustrated in FIG. 16, FIG. 16 illustrates a schematic flowchart of a split screen method according to further another embodiment of the present disclosure. The following will provide a detailed explanation of a process illustrated in FIG. 16. The method is implemented by the electronic device mentioned above, the electronic device includes the touch screen, and the touch screen includes the displayable area. In this embodiment, a foreground of the electronic device does not run an application, while a background of the electronic device runs multiple second applications. The split screen method can specifically include the following blocks.

At block S510: a sliding direction corresponding to a two-finger sliding operation is obtained in response to the two-finger sliding operation acting on the touch screen.

At block S520: the displayable area is split into a first split screen area and a second split screen area based on the sliding direction, and one of the first split screen area and the second split screen area is used to display a multi-task interface.

For a detailed description of the blocks S510 to S520, please refer to the blocks S110 to S120, which is not repeated here.

At block S530: a multi-task interface and/or multiple application icons corresponding to the multiple second applications are displayed in the first split screen area.

At block S540: a blank interface is displayed in the second split screen area.

In this embodiment, the foreground of the electronic device does not run the application (displays a system desktop), and the multiple second applications are run in the background of the electronic device. Based on this, after splitting the displayable area of the touch screen into the first and second split screen areas, the multi-task interface and/or multiple application icons corresponding to the multiple second applications can be displayed in the first split screen area, and the blank interface can displayed in the second split screen area.

Figure 17:
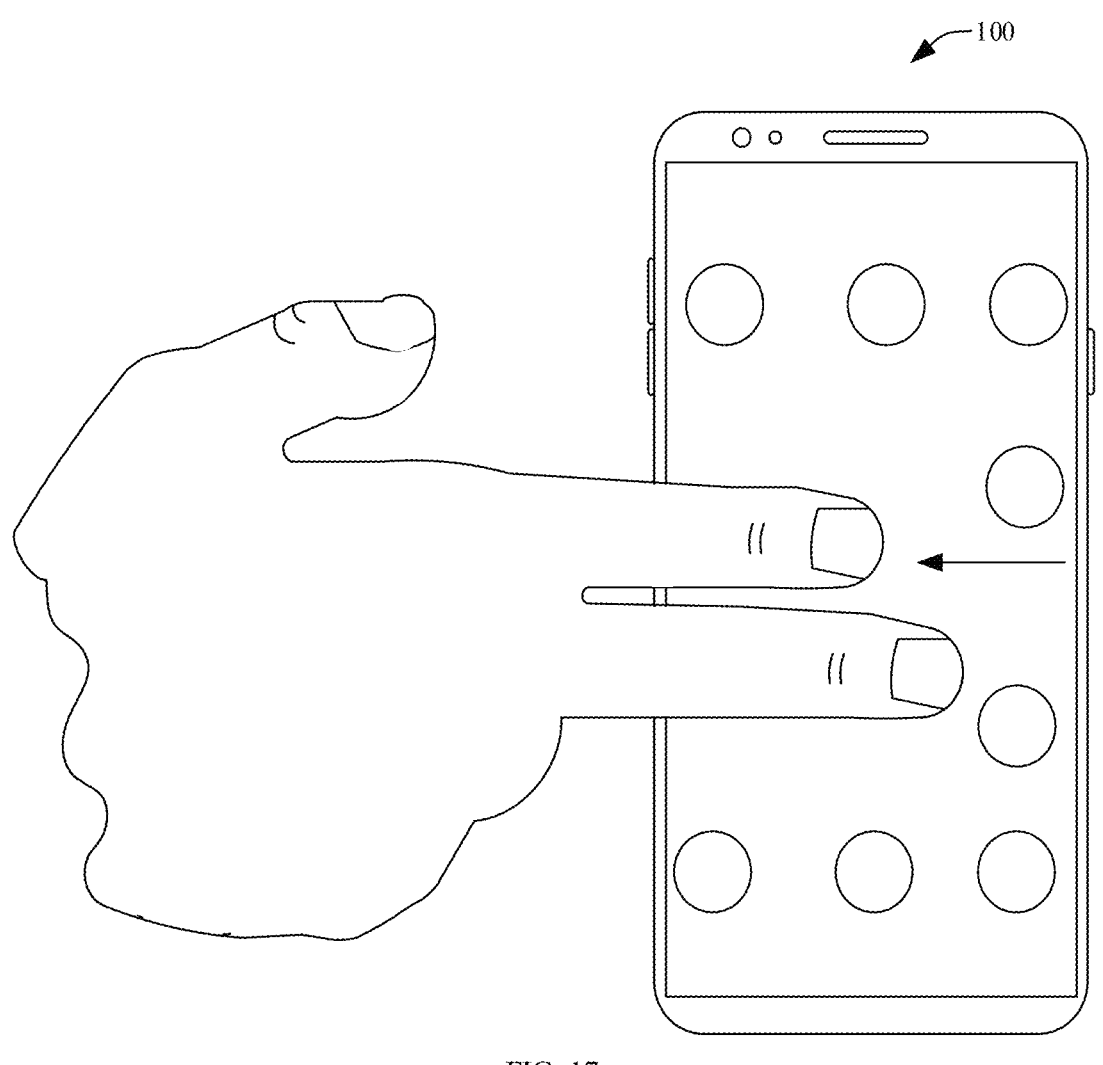
FIG. 17 illustrates a schematic diagram of an eleventh interface of an electronic device according to an embodiment of the present disclosure.
Figure 18:
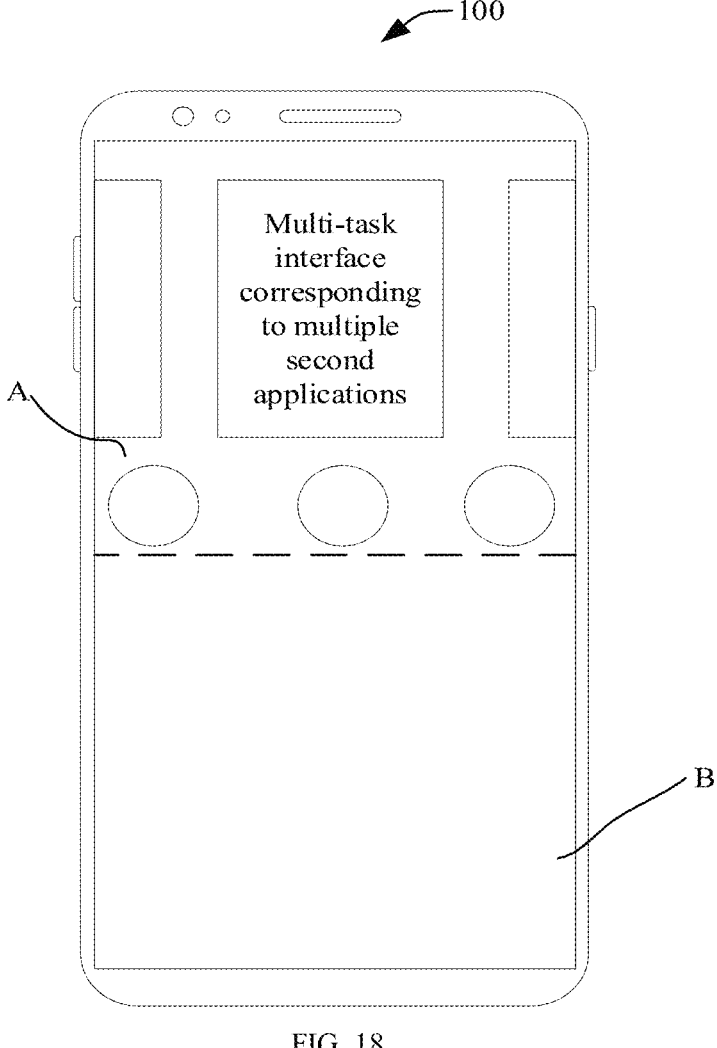
FIG. 18 illustrates a schematic diagram of a twelfth interface of an electronic device according to an embodiment of the present disclosure.

As illustrated in FIGS. 17 and 18, FIG. 17 illustrates a schematic diagram of an eleventh interface of an electronic device according to an embodiment of the present disclosure, and FIG. 18 illustrates a schematic diagram of a twelfth interface of an electronic device according to an embodiment of the present disclosure. As illustrated in FIG. 17, for a case that the foreground of the electronic device does not run the application (displays the system desktop) and the background of the electronic device runs multiple second applications, when a displayable area of a touch screen is split into a first split screen area A and a second split screen area B, a multi-task interface and multiple application icons corresponding to the multiple second applications can be displayed in the first split screen area A, and a blank interface can be displayed in the second split screen area B (as illustrated in FIG. 18).

At block S550: a target application corresponding to an application selection operation is obtained in response to the application selection operation acting on the first split screen area.

At block S560: an application interface corresponding to the target application is displayed in the first split screen area, and a multi-task interface and/or multiple application icons corresponding to multiple second applications are switched and displayed in the second split screen area.

In some embodiments, when the application selection operation acting on the multi-task interface and/or the multiple application icons corresponding to the multiple second applications displayed in the first split screen area is detected, the target application corresponding to the application selection operation can be obtained in response to the application selection operation, the application interface corresponding to the target application can be displayed in the first split screen area, and the multi-task interface and/or the multiple application icons corresponding to the multiple second applications can be displayed in the second split screen area, at this time, the multi-task interface and the multiple application icons corresponding to the second applications displayed in the second split screen area do not include a window and an icon corresponding to the target application.

As illustrated in FIG. 19, FIG. 9 illustrates a schematic diagram of a thirteenth interface of an electronic device according to an embodiment of the present disclosure. As illustrated in FIG. 19, when an application selection operation is detected on the multi-task interface and/or the multiple application icons corresponding to the multiple second applications displayed in the first split screen area A as illustrated in FIG. 18, a target application corresponding to the application selection operation can be obtained in response to the application selection operation. At this time, the application interface corresponding to the target application can be displayed in the first split screen area A, and the multi-task interface and/or the application icons corresponding to the second applications can be switched and displayed in the second split screen area B.

According to the split screen method provided by the further another embodiment of the present disclosure, the sliding direction corresponding to the two-finger sliding operation is obtained in response to the two-finger sliding operation acting on the touch screen, the displayable area is split into the first split screen area and the second split screen area based on the sliding direction, one of the first split screen area and the second split screen area is used to display the multi-task interface, the multi-task interface and/or the multiple application icons corresponding to the multiple second applications are displayed in the first split screen area, the blank interface is displayed in the second split screen area, the target application corresponding to the application selection operation is obtained in response to the application selection operation acting on the first split screen area, the application interface corresponding to the target application is displayed in the first split screen area, and the multi-task interface and/or the application icons corresponding to the second applications are switched and displayed in the second split screen area. Compared with the split screen method illustrated in FIG. 1, this embodiment displays the multi-task interface and/or the application icons corresponding to the second applications in the first split screen area when the first split screen area and the second split screen area are obtained for the case that the application is not running in the foreground and the multiple second applications are running in the background of the electronic device, and the application interface corresponding to the target application is displayed in the first split screen area and the multi-task interface and/or the application icons corresponding to the second applications are switched and displayed in the second split screen area when the application selection operation is detected in the first split screen area, thus the split screen display effect and the interactive experience of users are improved.

As illustrated in FIG. 20, FIG. 20 illustrates a schematic block diagram of a split screen apparatus according to an embodiment of the present disclosure. The split screen apparatus is applied to the electronic device mentioned above, the electronic device includes the touch screen, the touch screen includes the displayable area. The block diagram illustrated in FIG. 20 will be described below. The split screen apparatus 200 includes a sliding direction obtaining module 210 and a screen area splitting module 220.

The sliding direction obtaining module 210 is configured to obtain, in response to a two-finger sliding operation acting on the touch screen, a sliding direction corresponding to the two-finger sliding operation.

In some embodiments, the sliding direction obtaining module 210 includes: a position obtaining submodule and a sliding direction obtaining submodule.

The position obtaining submodule is configured to obtain, in response to the two-finger sliding operation acting on the touch screen, a sliding start position and a sliding end position corresponding to the two-finger sliding operation.

The sliding direction obtaining submodule is configured to obtain, based on the sliding start position and the sliding end position, the sliding direction corresponding to the two-finger sliding operation.

In some embodiments, the sliding direction obtaining submodule includes: a split screen trigger determining unit and a sliding direction obtaining unit.

The split screen trigger determining unit is configured to determine, in response to the sliding start position meeting a first preset position condition and the sliding end position meeting a second preset position condition, the two-finger sliding operation meeting a split screen trigger condition.

In some embodiments, the split screen trigger determining unit includes a split screen trigger determining subunit.

The split screen trigger determining subunit is configured to determine, in response to determining that a distance between the sliding start position and a first edge of the touch screen is less than a first preset distance, and a distance between the sliding end position and a second edge of the touch screen is less than a second preset distance, the two-finger sliding operation meeting the split screen trigger condition; and the first edge is opposite to the second edge.

The sliding direction obtaining unit is configured to obtain the sliding direction corresponding to the two-finger sliding operation.

The screen area splitting module 220 is configured to split, based on the sliding direction, the displayable area into a first split screen area and a second split screen area; and one of the first split screen area and the second split screen area is configured to display a multi-task interface.

In some embodiments, the screen area splitting module 220 includes a first screen area splitting submodule and a second screen area splitting submodule.

The first screen area splitting submodule is configured to split, based on the sliding start position and the sliding direction, the displayable area into the first split screen area and the second split screen area; and an end position of a boundary between the first split screen area and the second split screen area corresponds to the sliding start position.

The second screen area splitting submodule is configured to split, based on the sliding end position and the sliding direction, the displayable area into the first split screen area and the second split screen area, and an end position of a boundary between the first split screen area and the second split screen area corresponds to the sliding end position.

In some embodiments, a foreground of the electronic device runs a first application, and a background of the electronic device runs multiple second applications. The split screen apparatus 200 includes: a first application interface displaying module and a first multi-task interface displaying module.

The first application interface displaying module is configured to display an application interface corresponding to the first application in the first split screen area.

The first multi-task interface displaying module is configured to display a multi-task interface and/or multiple application icons corresponding to the multiple second applications in the second split screen area.

In some embodiments, a foreground of the electronic device does not run an application, and a background of the electronic device runs multiple second applications, and the split screen apparatus 200 includes: a second multi-task interface displaying module and a blank interface displaying module.

The second multi-task interface displaying module is configured to display a multi-task interface and/or multiple application icons corresponding to the multiple second applications in the first split screen area.

The blank interface displaying module is configured to display a blank interface in the second split screen area.

In some embodiments, the split screen apparatus 200 includes: a target application obtaining module and a second application interface displaying module.

The target application obtaining module is configured to obtain, in response to an application selection operation acting on the first split screen area, a target application corresponding to the application selection operation.

The second application interface displaying module is configured to display an application interface corresponding to the target application in the first split screen area, and switch and display a multi-task interface and/or multiple application icons corresponding to multiple second applications in the second split screen area.

It can be clearly understood by those skilled in the art that, for the convenience and conciseness of description, the specific working processes of the apparatus and modules described above can refer to the corresponding processes in the aforementioned method embodiments, and will not be repeated here.

In embodiments provided by the present disclosure, a coupling between modules can be electrical, mechanical or other forms of coupling.

In addition, functional modules in each embodiment of the present disclosure can be integrated into one processing module, or each module can exist physically alone, or two or more modules can be integrated into one module. The above integrated modules can be realized in the form of hardware or software functional modules.

Figure 21:
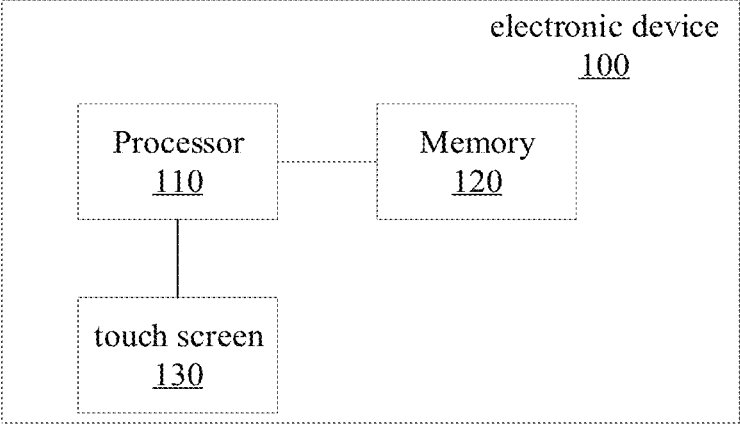
FIG. 21 illustrates a schematic block diagram of an electronic device for executing a split screen method according to an embodiment of the present disclosure.

As illustrated in FIG. 21, FIG. 21 illustrates a structural block diagram of an electronic device 100 according to an embodiment of the present disclosure. The electronic device 100 can be a smart phone, a tablet computer, an e-book and another electronic device capable of running applications. The electronic device 100 in the present disclosure may include one or more of the following components: a processor 110, a memory 120, a touch screen 130, and one or more applications, and the one or more applications may be stored in the memory 120 and configured to be executed by the one or more processors 110, and the one or more applications are configured to perform the method as described in the aforementioned method embodiment.

The processor 110 may include one or more processing cores. The processor 110 connects various parts in the whole electronic device 100 with various interfaces and lines, and executes various functions and processes data of the electronic device 100 by running or executing instructions, programs, code sets or instruction sets stored in the memory 120 and calling data stored in the memory 120. In some embodiments, the processor 110 may be implemented in at least one hardware form of digital signal processing (DSP), field-programmable gate array (FPGA) and programmable logic array (PLA). The processor 110 may be integrated with one or more combinations of central processing unit (CPU), graphics processing unit (GPU) and modem. CPU mainly deals with an operating system, a user interface and application programs. GPU is used to render and draw the content to be displayed. The modem is used to handle wireless communication. It can be understood that the above modem can also be realized by a communication chip without being integrated into the processor 110.

The memory 120 may include a random access memory (RAM) or a read-only memory (ROM). The memory 120 may be used to store instructions, programs, codes, code sets or instruction sets. The memory 120 may include a storage program area and a storage data area, the storage program area may store instructions for implementing an operating system, instructions for implementing at least one function (such as a touch function, a sound playing function, an image playing function, etc.), and instructions for implementing various method embodiments described above. The data storage area can store data (such as phone book, audio and video data, chat record data) created by the electronic device 100 in use.

The touch screen 130 is used to display information input by users, information provided to users and various graphical user interfaces of the electronic device 100. These graphical user interfaces can be composed of graphics, texts, icons, numbers, videos and any combination thereof. In some embodiments, the touch screen 130 can be a liquid crystal display (LCD) or an organic light-emitting diode (OLED).

Figure 22:
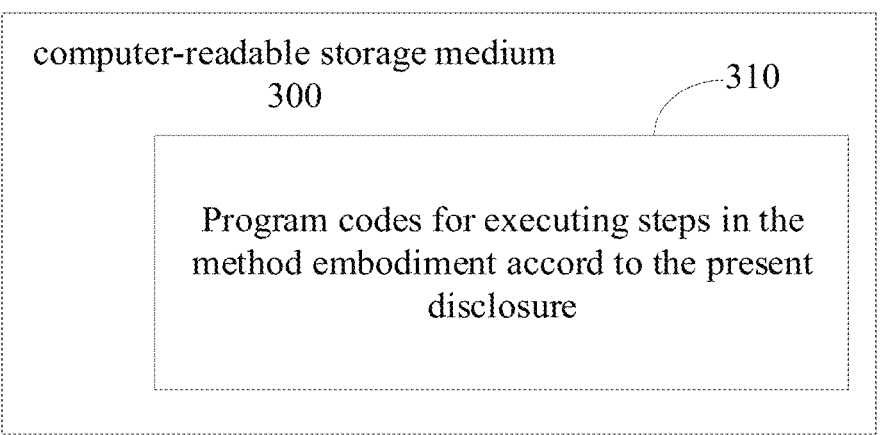
FIG. 22 illustrates a schematic diagram of a storage unit for storing or carrying program codes for implementing a split screen method according to an embodiment of the present disclosure.

As illustrated in FIG. 22, FIG. 22 illustrates a structural block diagram of a computer-readable storage medium according to an embodiment of the present disclosure. The computer-readable storage medium 300 has stored therein program codes which can be callable by a processor to execute the method described in the above method embodiment.

The computer-readable storage medium 300 may be an electronic memory such as a flash memory, an electrically erasable programmable read only memory (EEPROM), an erasable programmable read only memory (EPROM), hard disk or ROM. In some embodiments, the computer-readable storage medium 300 includes a non-transitory computer-readable storage medium. The computer-readable storage medium 300 has a storage space for the program codes 310 to execute the above method. These program codes can be read from or written into one or more computer program products. The program code 310 may be compressed in an appropriate form.

To sum up, according to the split screen method and apparatus, electronic device and storage medium provided by the embodiments of the present disclosure, the sliding direction corresponding to the two-finger sliding operation is obtained in response to the two-finger sliding operation acting on the touch screen, the displayable area is split into the first split screen area and the second split screen area based on the sliding direction, and one of the first split screen area and the second split screen area is used to display the multi-task interface, thus operation steps for splitting screen are simplified to improve a split screen speed by obtaining the sliding direction corresponding to the two-finger sliding operation acting on the touch screen and splitting the displayable area of the touch screen based on the sliding direction.

Finally, it should be explained that the above embodiments are only used to illustrate the technical solutions of the present disclosure, but not to limit it. Although the present disclosure has been described in detail with reference to the foregoing embodiments, it should be understood by those skilled in the art that the technical solutions described in the foregoing embodiments can still be modified or some technical features thereof can be replaced by equivalents. However, these modifications or substitutions do not drive the essence of the corresponding technical solutions away from the spirit and scope of the technical solutions of various embodiments of the present disclosure.

What is claimed is:

1. A split screen method, implemented by an electronic device, wherein the electronic device comprises a touch screen, the touch screen comprises a displayable area, and the method comprises:

obtaining, in response to a two-finger sliding operation acting on the touch screen, a sliding direction corresponding to the two-finger sliding operation; and splitting, based on the sliding direction, the displayable area into a first split screen area and a second split screen area;

wherein one of the first split screen area and the second split screen area is configured to display a multi-task interface;

wherein in a case where a foreground of the electronic device runs a first application and a background of the electronic device runs a plurality of second applications, after the splitting, based on the sliding direction, the displayable area into a first split screen area and a second split screen area, the method further comprises:

displaying an application interface of the first application in the first split screen area, and displaying a multi-task interface corresponding to the plurality of second applications in the second split screen area; and in response to a further two-finger sliding operation acting on the first split screen area:

splitting the first split screen area into a first sub split screen area and a second sub split screen area;

enlarging both the first sub split screen area and the second sub split screen area together; and displaying the enlarged first sub split screen area and the enlarged second sub split screen area with the multi-task interface corresponding to the plurality of second applications hidden, wherein the enlarged first sub split screen area and the enlarged second sub split screen area occupy a whole of the displayable area together.

2. The method as claimed in claim 1, wherein the obtaining, in response to a two-finger sliding operation acting on the touch screen, a sliding direction corresponding to the two-finger sliding operation, comprises:

obtaining, in response to the two-finger sliding operation acting on the touch screen, a sliding start position and a sliding end position corresponding to the two-finger sliding operation; and obtaining, based on the sliding start position and the sliding end position, the sliding direction corresponding to the two-finger sliding operation.

3. The method as claimed in claim 2, wherein the obtaining, based on the sliding start position and the sliding end position, the sliding direction corresponding to the two-finger sliding operation, comprises:

determining, in response to the sliding start position meeting a first preset position condition and the sliding end position meeting a second preset position condition, the two-finger sliding operation meeting a split screen trigger condition; and obtaining the sliding direction corresponding to the two-finger sliding operation.

4. The method as claimed in claim 3, wherein the determining, in response to the sliding start position meeting a first preset position condition and the sliding end position meeting a second preset position condition, the two-finger sliding operation meeting a split screen trigger condition, comprises:

determining, in response to determining that a distance between the sliding start position and a first edge of the touch screen is less than a first preset distance, and a distance between the sliding end position and a second edge of the touch screen is less than a second preset distance, the two-finger sliding operation meeting the split screen trigger condition;

wherein the first edge is opposite to the second edge.

5. The method as claimed in claim 2, wherein the obtaining, based on the sliding start position and the sliding end position, the sliding direction corresponding to the two-finger sliding operation, comprises:

obtaining, in response to the sliding start position meeting a first preset position condition and the sliding end position meeting a second preset position condition, a sliding distance corresponding to the two-finger sliding operation;

determining, in response to the sliding distance being greater than a preset distance, the two-finger sliding operation meeting a split screen trigger condition; and obtaining the sliding direction corresponding to the two-finger sliding operation.

6. The method as claimed in claim 2, wherein the splitting, based on the sliding direction, the displayable area into a first split screen area and a second split screen area, comprises:

splitting, based on a target position and the sliding direction, the displayable area into the first split screen area and the second split screen area;

wherein an end position of a boundary between the first split screen area and the second split screen area corresponds to the target position, and the target position is one of the sliding start position and the sliding end position.

7. The method as claimed in claim 2, wherein the obtaining, in response to the two-finger sliding operation acting on the touch screen, a sliding start position and a sliding end position corresponding to the two-finger sliding operation, comprises:

obtaining, in response to the two-finger sliding operation acting on the touch screen, coordinate information of a sliding starting point corresponding to the two-finger sliding operation, and coordinate information of a sliding ending point corresponding to the two-finger sliding operation;

obtaining, based on the coordinate information of the sliding starting point, the sliding start position corresponding to the two-finger sliding operation; and obtaining, based on the coordinate information of the sliding ending point, the sliding end position corresponding to the two-finger sliding operation.

8. The method as claimed in claim 2, wherein the obtaining, based on the sliding start position and the sliding end position, the sliding direction corresponding to the two-finger sliding operation, comprises:

obtaining a connecting direction of the sliding start position and the sliding end position;

performing angle correction on the connecting direction to obtain a target connecting direction; and obtaining, based on the target connecting direction, the sliding direction corresponding to the two-finger sliding operation.

9. The method as claimed in claim 1, wherein after the multi-task interface corresponding to the plurality of second applications is hidden, the method comprises:

in response to a first display switching instruction, maintaining displaying of the application interface in the enlarged first sub split screen area, and switching the enlarged second sub split screen area to display the multi-task interface corresponding to the plurality of second applications.

10. The method as claimed in claim 1, wherein in a case where the foreground of the electronic device does not run an application, and the background of the electronic device runs the plurality of second applications, after the splitting, based on the sliding direction, the displayable area into a first split screen area and a second split screen area, the method further comprises:

displaying the multi-task interface corresponding to the plurality of second applications in the first split screen area; and displaying a blank interface in the second split screen area.

11. The method as claimed in claim 10, wherein after displaying the multi-task interface corresponding to the plurality of second applications in the first split screen area, and displaying a blank interface in the second split screen area, the method comprises:

obtaining, in response to an application selection operation acting on the first split screen area, a target application corresponding to the application selection operation; and displaying an application interface of the target application in the first split screen area, and switching and displaying a multi-task interface corresponding to remaining second applications in the plurality of second applications except the target application in the second split screen area.

12. The method as claimed in claim 1, wherein the obtaining, in response to a two-finger sliding operation acting on the touch screen, a sliding direction corresponding to the two-finger sliding operation, comprises:

detecting, in response to the touch screen being in a lit state, a touch operation acting on the touch screen; and obtaining, in response to the two-finger sliding operation, the sliding direction corresponding to the two-finger sliding operation when the two-finger sliding operation acting on the touch screen is detected.

13. The method as claimed in claim 12, wherein the detecting, in response to the touch screen being in a lit state, a touch operation acting on the touch screen, comprises:

detecting, in response to the touch screen is in the lit state and an unlocked state, the touch operation acting on the touch screen.

14. The method as claimed in claim 13, wherein the detecting, in response to the touch screen is in the lit state and an unlocked state, the touch operation acting on the touch screen, comprises:

detecting, in response to the touch screen being in the lit state and the unlocked state, a currently displayed interface of the touch screen; and detecting, in response to detecting that the currently displayed interface of the touch screen is a desktop or an application interface, the touch operation acting on the touch screen.

15. The method as claimed in claim 1, wherein the obtaining, in response to a two-finger sliding operation acting on the touch screen, a sliding direction corresponding to the two-finger sliding operation, comprises:

obtaining, in response to the two-finger sliding operation acting on the touch screen, a sliding trajectory corresponding to the two-finger sliding operation; and obtaining, based on the sliding trajectory, the sliding direction corresponding to the two-finger sliding operation.

16. The method as claimed in claim 1, further comprising:

displaying the application interface of the first application in both the enlarged first sub split screen area and the enlarged second sub split screen area.

17. An electronic device, comprising:

a memory and a processor, wherein the memory is configured to store instructions, which when executed by the processor, causes the processor to implement a split screen method, the method comprising:

obtaining, in response to a target sliding operation acting on a touch screen of the electronic device, a sliding direction corresponding to the target sliding operation;

determining a split screen direction based on the sliding direction; and splitting, based on the split screen direction, a displayable area of the touch screen into a first split screen area and a second split screen area;

wherein one of the first split screen area and the second split screen area is configured to display a multi-task interface;

wherein in a case where a foreground of the electronic device runs a first application and a background of the electronic device runs a plurality of second applications, after the splitting, based on the split screen direction, a displayable area of the touch screen into a first split screen area and a second split screen area, the method further comprises:

displaying an application interface of the first application in the first split screen area, and displaying a multi-task interface corresponding to the plurality of second applications in the second split screen area; and in response to a further target sliding operation acting on the first split screen area:

splitting the first split screen area into a first sub split screen area and a second sub split screen area;

enlarging both the first sub split screen area and the second sub split screen area together; and displaying the enlarged first sub split screen area and the enlarged second sub split screen area with the multi-task interface corresponding to the plurality of second applications hidden, wherein the enlarged first sub split screen area and the enlarged second sub split screen area occupy a whole of the displayable area together.

18. The electronic device as claimed in claim 17, wherein the method further comprises:

displaying the application interface of the first application in both the enlarged first sub split screen area and the enlarged second sub split screen area; and in response to a first display switching instruction, maintaining displaying of the application interface of the first application in the enlarged first sub split screen area, and switching the enlarged second sub split screen area to display the multi-task interface corresponding to the plurality of second applications.

19. A non-transitory computer-readable storage medium having stored program code, which when executed by a processor, causes the processor to implement a split screen method, the method comprising:

determining, in response to a user's split screen operation acting on a touch screen of an electronic device, a split screen direction, wherein the split screen direction is parallel to a target direction, and the target direction is one of a longitudinal axis direction of the electronic device, a transverse axis direction of the electronic device, and a diagonal direction of the electronic device;

splitting, based on the split screen direction, a displayable area of the touch screen into a first split screen area and a second split screen area; and wherein one of the first split screen area and the second split screen area is configured to display a multi-task interface;

wherein in a case where a foreground of the electronic device runs a first application and a background of the electronic device runs a plurality of second applications, after the splitting, based on the split screen direction, a displayable area of the touch screen into a first split screen area and a second split screen area, the method further comprises:

displaying an application interface of the first application in the first split screen area, and displaying a multi-task interface corresponding to the plurality of second applications in the second split screen area; and in response to a further split screen operation acting on the first split screen area:

splitting the first split screen area into a first sub split screen area and a second sub split screen area;

enlarging both the first sub split screen area and the second sub split screen area together; and displaying the enlarged first sub split screen area and the enlarged second sub split screen area with the multi-task interface corresponding to the plurality of second applications hidden, wherein the enlarged first sub split screen area and the enlarged second sub split screen area occupy a whole of the displayable area together.

20. The non-transitory computer-readable storage medium as claimed in claim 19, wherein the method further comprises:

displaying the application interface of the first application in both the enlarged first sub split screen area and the enlarged second sub split screen area; and in response to a first display switching instruction, maintaining displaying of the application interface of the first application in the enlarged first sub split screen area, and switching the enlarged second sub split screen area to display the multi-task interface corresponding to the plurality of second applications.

* * * * *